United States Patent
Levy

(10) Patent No.: US 12,020,261 B2
(45) Date of Patent: Jun. 25, 2024

(54) MARKET-BASED FACT VERIFICATION MEDIA SYSTEM AND METHOD

(71) Applicant: David Levy, Berkeley, CA (US)

(72) Inventor: David Levy, Berkeley, CA (US)

( * ) Notice: Subject to any disclaimer, the term of this patent is extended or adjusted under 35 U.S.C. 154(b) by 0 days.

(21) Appl. No.: 17/574,541

(22) Filed: Jan. 12, 2022

(65) Prior Publication Data

US 2022/0351213 A1 Nov. 3, 2022

Related U.S. Application Data

(63) Continuation of application No. 15/820,428, filed on Nov. 21, 2017, now abandoned.

(60) Provisional application No. 62/424,868, filed on Nov. 21, 2016.

(51) Int. Cl.
| | |
|---|---|
| G06Q 30/018 | (2023.01) |
| G06Q 20/10 | (2012.01) |
| G06F 16/23 | (2019.01) |
| G06Q 50/18 | (2012.01) |

(52) U.S. Cl.
CPC ............ *G06Q 30/018* (2013.01); *G06Q 20/10* (2013.01); *G06F 16/2365* (2019.01); *G06Q 50/182* (2013.01)

(58) Field of Classification Search
CPC . G06Q 30/018; G06Q 50/182; G06F 16/2365
USPC ........................................................ 705/3–44
See application file for complete search history.

(56) References Cited

U.S. PATENT DOCUMENTS

| | | | |
|---|---|---|---|
| 7,792,732 B2 | 9/2010 | Haggerty | |
| 8,170,938 B2 | 5/2012 | Haggerty | |
| 8,326,671 B2 | 12/2012 | Haggerty | |
| 8,732,023 B2 | 5/2014 | Mikurak | |
| 9,292,493 B2 | 3/2016 | Chandramouli | |
| 9,378,065 B2 | 6/2016 | Shear | |
| 10,033,537 B2 * | 7/2018 | Heppe | G06Q 30/00 |
| 11,526,675 B2 * | 12/2022 | Ghulati | G06F 40/205 |
| 2002/0107709 A1 | 8/2002 | Colson | |
| 2006/0287970 A1 * | 12/2006 | Chess | G06Q 10/10 |
| | | | 715/236 |

(Continued)

OTHER PUBLICATIONS

Chowdhur, "Combating Post Truth, Fake News, False News and Censorship", Business World Athena Information Solutions Pvt. Ltd, Apr. 8, 2018.*

(Continued)

*Primary Examiner* — Frantzy Poinvil
(74) *Attorney, Agent, or Firm* — Greenberg Traurig, LLP

(57) ABSTRACT

The system and methods described herein provide a way for writers and publishers to stand behind individual and combined facts in their work by offering a bounty to a person who can supersede their own data in support of the fact's accuracy with better data, as measured by a pre-established fact evaluation guideline. Once sufficiently vetted by this system, facts are added to an apolitical certified fact database. Facts in the certified fact database also have a bounty upon their accuracy, however financial responsibility for the bounty is transferred to the system. Subscribers to the system may then download and use fact contained within the certified fact database to enhance their own work, while benefiting from the enhanced readership, interest and trustworthiness provided by virtue of the bounty.

13 Claims, 9 Drawing Sheets

(56) References Cited

U.S. PATENT DOCUMENTS

| | | | |
|---|---|---|---|
| 2010/0112866 A1 | 5/2010 | Friedhof | |
| 2013/0159127 A1* | 6/2013 | Myslinski | G06Q 10/10 |
| | | | 705/26.1 |
| 2013/0185182 A1 | 7/2013 | Au | |
| 2014/0019331 A1 | 1/2014 | Megdal | |
| 2014/0052647 A1 | 2/2014 | Hayes-Roth | |
| 2014/0310157 A1 | 10/2014 | Haggerty | |
| 2015/0248736 A1* | 9/2015 | Myslinski | G06F 3/0488 |
| | | | 705/319 |
| 2015/0317648 A1 | 11/2015 | Albert | |
| 2017/0195125 A1 | 7/2017 | Heppe | |
| 2018/0253464 A1* | 9/2018 | Kohli | G06F 16/219 |
| 2021/0019304 A1* | 1/2021 | Nahumi | G06F 16/2365 |
| 2021/0117417 A1* | 4/2021 | Hendrickson | G06F 16/90 |

OTHER PUBLICATIONS

Fan et al., "Mimicking Human Verification Behavior for News Media Credibility Evaluation", Applied Sciences 13.17: 9553, MDPI AG. (Year: 2023).*
Factcheck.Org, www.factcheck.org, Accessed Jul. 27, 2022.
JustFacts, www.justfact.com, Accessed Jul. 27, 2022.
Politifact, www.politifact.com, Accessed Jul. 27, 2022.
Snopes, www.snopes.com, Accessed Jul. 27, 2022.

* cited by examiner

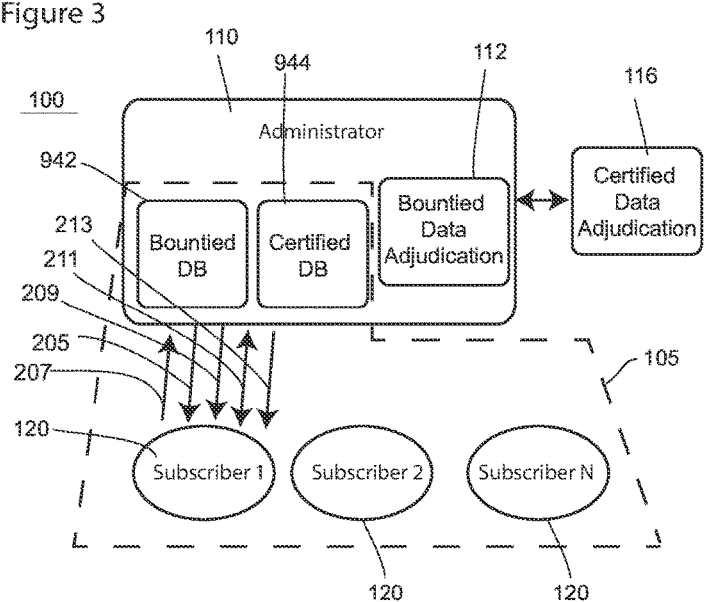

|  | QUALITY | QUANTITY |
|---|---|---|
| 67 | 1) Distance to the original source | 5) Number of data points |
|  | 2) Degree of bias/objectivity | 6) Completeness/omissions |
|  | 3) In cases involving expertise, identify the quality of the expertise | 7) Excessive complexity |
|  | 4) Unaltered | 8) Analysis |
|  | Participants are immaterial |  |

MARKET-BASED FACT VERIFICATION MEDIA SYSTEM AND METHOD

CROSS-REFERENCE TO RELATED APPLICATION

This application is a continuation of U.S. application Ser. No. 15/820,428 filed Nov. 21, 2017, which is incorporated by reference herein in its entirety, which claims the benefit of the Nov. 21, 2016 filing date of provisional application 62/424,868 titled Market-based Fact Verification Media System and Method. Prior applications are incorporated herein by reference in their entirety.

FIELD OF INVENTION

This technology relates generally to the field of media and the presentation of informative content and has certain specific application to enhancing the reliability and trustworthiness of informative content presented as factual and creating an apolitical database of facts.

BACKGROUND

One of the cornerstones for a democratic society is for its citizens to have information upon which to make decisions. This information reaches the public through content providers of media and especially journalism, in all its forms.

50 years ago the American public trusted that journalism existed under a code of ethics in which journalists did their best to present the truth as they found it. Today, almost the opposite is true. The American public now assumes, often correctly, that journalists perform their job within the context of heavy bias, typically a political bias in which journalists who provide information that aligns with their political belief are providing factual information and the journalists of the other side are providing "fake news," meaning the information provided as fact is actually contrived by the journalists.

The result is untenable: instead of the population accepting a common set of "the facts" (as reported by the bulk of the journalism profession) and then having rational debate about the best path for the country based on "the facts" (as occurred 50 years ago) . . . Debate now occurs over the facts themselves. Consequently, the dialogue cannot elevate to a meaningful discussion about how to progress. The result is rancor and national discord. A democracy reduced to debating which basic facts are true is a democracy at risk.

Another aspect of the problem is that people increasingly limit their media exposure to sources that support their own beliefs. Furthermore, it is desirable for a content media outlet to increase its readership.

The country, and perhaps the world, would benefit from having these problems addressed in at least one of the following ways: 1) provide a mechanism to help establish the accuracy and/or trustworthiness of individual statements independent of political affiliation or bias; 2) provide a mechanism to establish a common set of facts; 3) provides a mechanism to identify journalists operating ethically, both in the context of an individual article, but also as a body of work; 4) provide means to increase the reputation and trustworthiness of individual journalists, participating media outlets, and the journalism profession as a whole; 5) provide a means to visually differentiate between fake news and real news that is both under control of the author and also with a component outside of the author's control; and 6) provide a system that encourages persons on the left to read materials written by the right and likewise encourages persons on the right to read materials written by persons on the left.

And simultaneously, in order to support these public-minded objectives, the system needs to be self-sustaining by providing a new way for content media providers to attract readership/viewers.

SUMMARY

Phase 1—Bounty of Facts

In an introductory embodiment, somewhat simplified for clarity, the system and method includes a software infrastructure that integrates into the websites of fact-oriented content providers (especially journalists) who subscribe in order to gain access to the following functionality: content providers may offer a "bounty" (e.g. financial reward) to anyone who can disprove the accuracy of a specific statement presented as fact. Note: a "fact" as used within this application can be more than a single sentence. However, it must be a continuous sequence, together representing a single statement. In this embodiment, the size of the bounty is determined by the content provider, who also endows the bounty with their own funds. In one embodiment, these funds, at least a part, are held in escrow by the administrator of the system and method. (Note: This embodiment is described in the context of web-based text. Other embodiments apply to printed text and video presentations.)

Content providers select which individual statements within their content shall be bountied facts, as well as the size of each bounty. In one embodiment, bountied facts may be strung together, forming "complex bountied facts."

Each bountied fact is identified by a visual identification feature, such a specific identifying font or color and/or with a specific iconography located at the beginning and/or end of the statement they chose to bounty. In this embodiment, readers can access auxiliary information about the fact by interacting directly the text of the fact itself, or in one embodiment by selecting the bountied fact icon (FIG. 2B) thereby actuating a popup containing the information. Auxiliary information includes: the size of the bounty, the source material used to establish the validity of the fact, the claim history of the fact, the author, and a serial number associated with the fact. In another embodiment the size of the bounty is displayed next to the bountied fact identification icon.

Upon reading the bountied fact and the auxiliary information, a reader may decide to file a claim, thereby becoming a "claimant" seeking to win the bounty. In this embodiment, if a claimant can prove the bountied fact is false or misleading: (i) he or she would be awarded the bounty; (ii) the bountied fact will be corrected and (iii) in one embodiment the visual identification features (e.g. font, color and/or bountied fact icon) will be altered to reflect the corrected status.

One criteria used to make the determination whether or not the bounty will be awarded is to reference a set of pre-established objective guidelines. For system or process/method to be widely accepted, these guidelines need to be simple rules that rigorously apply to all fact analyses. In this embodiment, these pre-established objective guidelines require the adjudicator to focus on the quality and quantity of the evidence supporting the original fact (on behalf of the content provider) relative to the quality and quantity of the evidence provided by the claimant. The adjudicator therefore is seeking to determine the relative strength of the fact support information provided by the two parties. The adjudicator is NOT seeking to determine truth on an absolute scale, or even to evaluate the veracity of the fact itself.

Furthermore the while the adjudicator is acting as judge in the traditional sense, a proper adjudication in the context of the system and method is almost entirely analytic, a mechanical comparison along the predetermined guidelines.

Broad examples of the guidelines include: first person support will be victorious over second person support; many data points will be victorious over few data points of similar type/quality; experts in the field will be victorious over novices; complete quotations will be victorious over partial quotations; an analysis that includes all factors will be victorious over an analysis that omits a pertinent factor; position verified by multiple sources will be victorious over a position verified by a single source; objective sources will be victorious over biased sources.

While such an analysis may be inadequate to determine shades of gray in a nuanced or especially complex example, the gulf between fake news and legitimate news is quite large. Therefore, one aspect of the system and method is that decisions with an ambiguous outcome (as determined by the guideline) will be adjudicated as "indeterminate." In these cases the claimant will have successfully identified that the bountied fact is not accurate enough to be identified as a fact but not inaccurate enough that it can be declared to be false or misleading. One may ask about the gray area between "indeterminate" and determinate? With respect to the system and method, the answer is a gray area between the gray area is also "indeterminate." The reason the guideline works in the real world, is as stated: the gulf between fake news and legitimate news is large.

One aspect of the system and method is transparency. Examples include: Allowing the results of the adjudication process to be public, in one embodiment including all communications between the parties.

The information above constitutes one embodiment of a first phase of the system and method, which can function independently, however, another embodiment includes a second phase, here referred to as "Certification."

Phase 2: Certification

In one embodiment, a bountied fact reaches a "vetted" status, by virtue of achieving a specific number of viewings, and/or time without its veracity disproved by a claimant. Once vetted, aboutied fact is declared to be "Certified" and thereafter identified by a characteristic visual identification feature, such as printing the text in a specific identifying font or color and/or adding a "certified fact icon" located at the beginning and/or end of the fact, thereby distinguishing between bountied and certified facts. As with bountied facts, readers can access auxiliary information about certified facts by interacting directly with them, or by actuating the associated certified fact icon.

Also in this embodiment, certified facts are different than bountied facts in other ways, such as: (i) financial responsibility for the bounty transfers from the content provider to the system administrator; (ii) the size of the bounty is significantly increased; (iii) certified facts are entered into a certified fact database, available to the content providers who participate in the system (e.g. subscribers) and these subscriber content providers may download any certified fact and include the fact (which retains its increased bounty) in their own content; and (iv) certified facts are adjudicated by independent third-party mediators, following the same guidelines used to adjudicate bountied facts. And, analogous with the processes associated with a bountied fact, a certified fact may be challenged by a bounty hunter (claimant) seeking to prove that the fact (now certified) is false and/or misleading in an adjudication process and—if adjudicated in her favor—subsequently being awarded the increased certified award, necessitating the correction of the fact and altering the identifier to reflect the corrected status. In one embodiment, the certified bounty is paid from the financial resources of the administrator 110 and the adjudication is performed by fourth party.

By example: Content Provider A places a bounty on Fact A of $1000. After a month without Fact A losing an adjudication (including an indeterminate ruling) Fact A is elevated to certified status, now bountied at $10,000 and placed in the common database. Content Provider B searches the database for facts on a particular topic and likes Fact A. Content Provider B can then download Fact A for use in its own stories, which will now be visually identified as a "certified fact" and bountied at $10,000 by administrator-owned funds. If a reader now files a claim, it will be adjudicated by an independent third-party.

In one embodiment, the system and method offers a "super bounty" to a person who can prove the system and method, as implemented, is biased.

In one embodiment, the system and method also provides a rating system for content provider subscribers that indicates their history and/or ranking within the context of the system and method. History can include data such as number of bountied facts, number of times bounties have been corrected, the average bounty size. This information would be distributed to content provider subscribers as part of the software infrastructure.

The system and method provides a few important benefits:

1) It provides INSTANTANEOUS visual metric to the reader about the degree a given article or media outlet is willing to TRULY stand behind their work—without reading a single word. The fact that content provider is willing to put its own money "on the line" to stand behind its work instantly adds credibility.
2) The simultaneous desire to disprove assertions by the other political party AND to financially profit is strong motivation for people on the left to read materials written by the right and for people on the right to read materials written by the left. This helps reduce the bifurcation of media consumption by political party, which is good for the country.
3) "Truth through economics" is independent of political party, and therefore provides a much-needed neutral platform.
4) Reputable journalists will use the system and method as a way to stand behind their work and to benefit from the increased readership from both readers seeking verifiably true information and from people of the other side of the political spectrum simply seeking the bounty.
5) Fake news journalists will not use the system and method, because they will lose arbitrations, costing them both money and reputation. The result is that real news will be visually differentiated. Research indicates that most readers want to know the truth. Therefore, this visual differentiation should shift readership toward media outlets choosing to subscribe to the system and method.
6) Articles containing many bountied and/or certified facts will be hard to dismiss. Moreover, articles containing certified facts with very large bounties will be nearly impossible to dismiss. Articles with none will be identified as opinion and/or fake news. And, for the same reason, it is believed that content providers who subscribe to the system and method will be more widely read than content providers who choose not to subscribe. This feature is the economic basis for the system and method charging subscriber fees and to be financially self-sustaining.

7) Providing a mechanism for people who are following fake news to reevaluate their position over time, with compounding evidence. Specifically, it is self-evident that if a person continually observes (over weeks, months, and eventually years) that their information diet is fed by content containing little or no bountied/certified information, and that the content of the "opposition" is consistently populated with bountied and certified facts in much higher proportion . . . this person needs to resolve a growing internal conflict. This person will be placed in the position of continually believing the facts provided by a source that is unwilling to stand behind the facts, and yet the opposition, theoretically providing "fake news" is standing behind their information.

8) By virtue of the certified database being available to all subscribers, the system creates a common database of facts for the country thereby elevating discussion from which set of facts to believe. . . . To how best to move forward, based on the FACTS.

In some embodiments, the system and method applies to printed content such as magazines, newspapers and the like.

In some embodiments, the system and method applies to video content: (i) to dynamically identify content briefly displayed as text on screen (ii) to dynamically identify audio statements, and (iii) to pervasively identify a particular show or content provider his maintained a particular high standard of performance within the context of the system and method in in text-based applications.

One embodiment includes a general certification status which can be awarded to a subscriber is a function of high-performance with regard to adjudications within the context of the system and method. In one embodiment the certification status is exemplified by icon 222.

DESCRIPTION OF DRAWINGS

FIG. 2A shows an example of visual indication features identifying bountied facts.

FIG. 2B shows one example in FIG. 2A actuated to identify associated background information.

FIG. 2C one embodiment of claim submission form.

FIG. 3 shows operational and organizational aspects of an embodiment of the system and method.

Like reference symbols in the various drawings indicate like elements.

DETAILED DESCRIPTIONS

The following is a description of exemplary embodiments to illustrate the principles of the system and method. The embodiments are provided to illustrate aspects of the system and method, but the system and method is not limited to any embodiment. The scope of the system and method encompasses numerous alternatives, modifications and equivalent; it is limited only by the claims. Numerous specific details are set forth in the following description in order to provide a thorough understanding of the system and method. However, the system and method may be practiced according to the claims without some or all of these specific details. For the purpose of clarity, technical material that is known in the technical fields related to the system and method has not been described in detail so that the system and method is not unnecessarily obscured.

Figure 1:
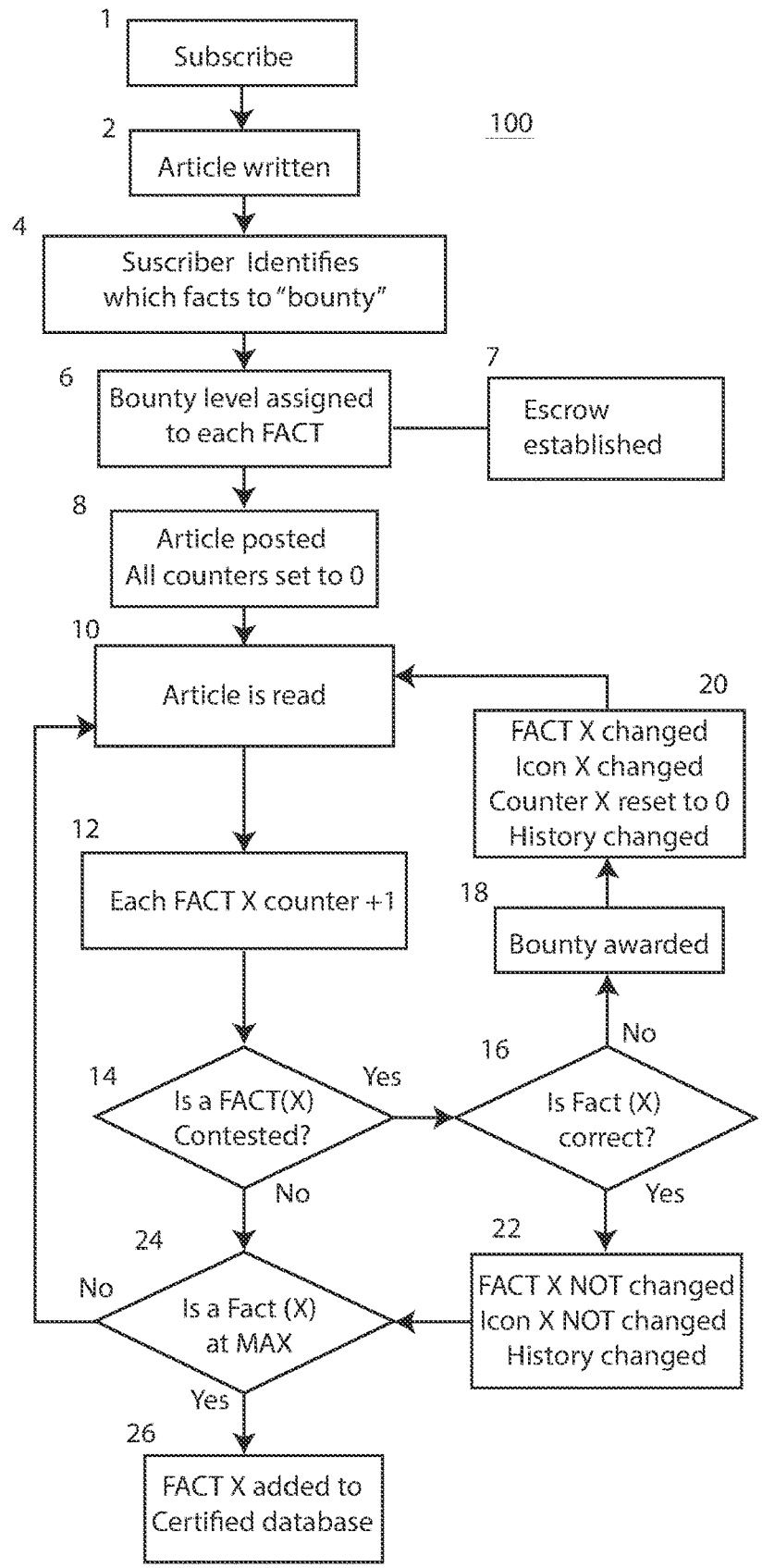
FIG. 1 shows an embodiment example a flowchart showing key operational components of the system and method.

FIG. 1 shows a flowchart of a web-based embodiment containing many operational components operation of the system and method. In step 1, an author and/or a publisher (jointly, a participating "content provider") becomes a subscriber 120. In step 2, content provider subscriber 120 creates content, such as a factually-based written article presented online. (Note, while this example is given within the context of online text, the functionality of the system and method may be provided in video, audio and printed text formats. Therefore, in alternate embodiments content provider content provider subscriber 120 may be a creator of audio, video or written content.) In step 4, subscriber 120 decides to substantiate the validity of a specific potentially controversial subset of the overall content (a "Fact") by specifically identifying the subset as a fact worthy of supporting and identifying that a bounty that will be paid if a person (e.g. viewer/reader/listener) can successfully disprove the validity of the fact according to pre-established fact-evaluation guidelines 67. In step 6, the amount of the bounty is selected by the subscriber 120. (Note One embodiment includes step 7 in which subscriber 120 places funds in escrow with an administrator 110 to cover at least part of the bounty established in step 6. In step 8, the content is published, such a web-based content provider like Facebook or the New York Times. The fact of interest is identified as "bountied" (e.g. identified as a "bountied fact 200") by means such as a particular: font, font color (such as light green), highlighting (such as light green), and/or a bountied fact icon 202 located at the beginning and/or the end of each bountied fact 200. The user can reveal additional information, such as shown in FIG. 2A. Also in step 8, a counter is set to zero, indicating that the article has never been read with the fact of interest as currently written.

In step 10, the article is available for consumers to read. Each time the article is read in its current form by one person, or presumed to have been read, the counter increments one, in step 12. In one embodiment the count is incremented each time the article is accessed by a unique IP address. Any known method of tracking Internet usage is applicable. The objective is to measure the number of times the article is read by different people, any one of which can file a claim to win the bounty placed on bountied fact 200.

Figure 4:
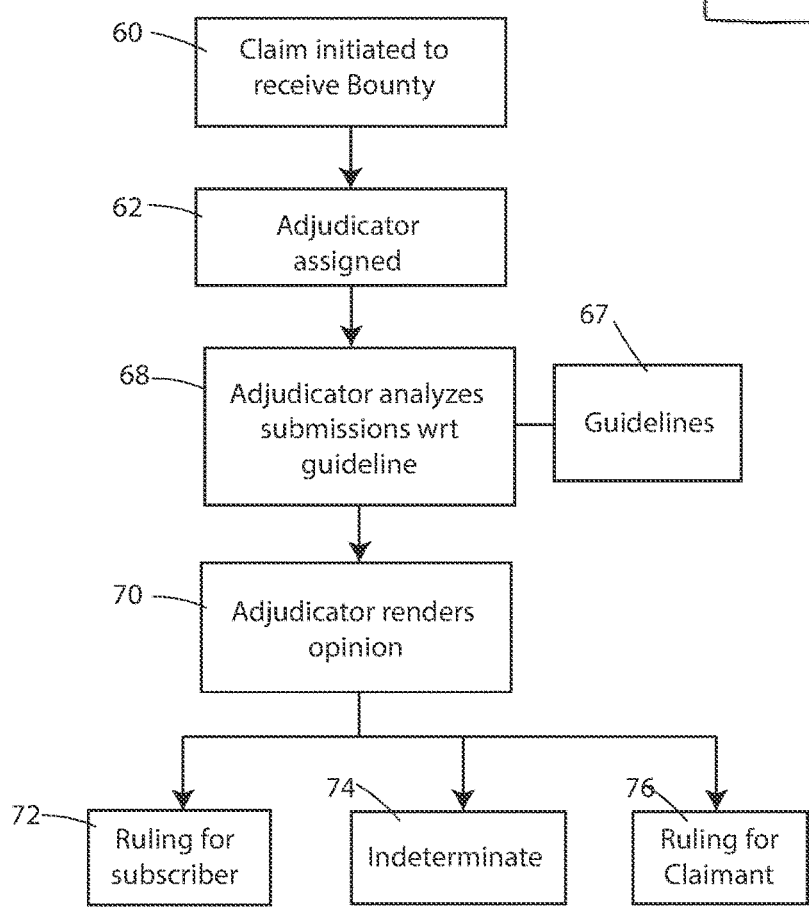
FIG. 4 shows a flowchart of an exemplary adjudication process of the system and method.

Step 14 is a branch point as to whether or not a reader has yet filed a claim to challenge the validity of bountied fact 200. If a reader files such a claim through the system 100, it is adjudicated in step 16 (FIG. 4). In the event adjudication 16 is decided on behalf of the claimant 80, the bounty is awarded to the claimant 80 in step 18. In step 20, bountied fact 200 is rewritten to reflect leanings from adjudication 16. Likewise, any visual identification feature 201 such as bountied fact icon 202, may be updated as described in FIG. 2A.

The counter, originally set to zero in step 8, is now reset to zero again, indicating the number of opportunities consumers have had to observe the improved bountied fact 200 is zero, despite the fact that the original article may have been accessed many times in its previous incarnation. Claim history 52 and detailed adjudication history 53 are updated, to reflect the adjudication 16. The content continues to be accessed by consumers in step 10.

In step 22 is the event in which adjudication 16 is decided on behalf of subscriber 120 (e.g. bountied fact 200 was not found to be false or misleading). In step 22, bountied fact 200 is left unchanged, as is any associated visual identification feature 201. However, claim history 52 is updated, to reflect the adjudication 16. In step 24, the System evaluates whether the bountied fact 200 has been exposed to a requisite number (such as a MAX=100,000) of readers in order to qualify as being "vetted" (a vetting threshold). If the counter has not reached MAX, the content continues to be accessed by consumers in step 10.

However, if bountied fact 200 is vetted in step 24, it elevates to a "certified" status, as Certified fact 220 and added to Certified fact database 944 in step 26. In this embodiment, certified facts 220 have the following characteristics: 1) the bounty is increased; 2) the visual identification feature 201, changes to indicate certified fact 220 status; 3) in embodiments in which financial responsibility for the bounty originally rests with the publisher, financial responsibility shifts to the system administrator; 4) in embodiments in which adjudication was performed by system administrator 110, responsibility for adjudication moves to an independent third-party 116; 5) Certified database 944 is searchable by subscribers 120 and the public; and 6) Certified facts 220 are available for use by subscribers in their own content, yet retaining the certified status described herein.

In one embodiment, bountied facts 200 or certified facts 220 are strung together in sequence to establish bountied complex facts 999, FIG. 2A shows two examples of visual indication features 201. The sentence beginning "His campaign" represents a bountied fact 200 identified with bold italics font. In this embodiment the bold italics font represents a color that will be associated with bounty facts 200, such as a first shade of a system-associated color such as light green. Another visual indication features 201 is that bountied fact 200 is identified by bountied fact icon 202, also of a specific color associated with its bountied status.

The sentence beginning with "Once trump" represents a certified fact 220 and identified with "black" font. The "black" font represents a color that would be associated with certified facts 220, such as a second shade of a system-associated color such as dark green. Another visual identification feature 201 is that certified fact 220 is identified by a certified fact icon 222, also of a particular color associated with certified facts. In this example a dark green. (Note: colors are not shown because it is simple enough to explain rather than to use a color drawing.)

FIG. 2B shows an embodiment interface to access popup information tag 50 and shows representative information contained therein. In this embodiment, the reader activates certified fact icon 222. (Cursor shown) In other embodiments the user interacts directly with the certified fact 220. Information tag 50 provides auxiliary information to the user related to certified fact 220 such as: the amount of the bounty 56; the raw fact support information 84 identified by the subscriber 120 in support the validity of the fact, as well as an explanation how the raw information applies within the context of guidelines 67; the author/publisher; the date the information was originally posted; the overview claim history 52 (e.g. the number of times a claim has been filed against this particular fact and the number of bounties paid.), serial number 54, access to the claim initiation interface 55 and a path to access the detailed adjudication history 53, including the adjudication proceedings of each claim. In one embodiment the adjudication history includes communications and a detailed analysis of the conclusion. In this embodiment, the color of the text indicates the current status: e.g. bountied: (light green), certified (dark green), no longer bountied, but accurate (black) or no longer bountied and indeterminate (orange). The color of the icon is associated with the history: e.g. green icon (light or dark) represents the text is original and a black icon indicates the text has been altered due to a previous claim. Therefore, black text with a black icon, indicates the wording can be trusted as accurate, but there is no bounty being offered and the content provider lost the previous adjudication.

FIG. 2C shows an exemplary claim submission form 60 activated by claim initiation interface 55. Form 60 is designed to allow claimant 80 to submit a set of bounty support information 82 in an attempt to supersede the accuracy of the set of fact support information 84 provided by subscriber 120. In this embodiment form 60 is organized in coordination with guidelines 67, exemplified here following FIG. 6. Form 60 (for claimant 80) is similar to form 62 (for subscriber 120). Notable differences/clarifications in form 62: the title is changed from "Claim Submission Form" to "Fact Support Form", "personal info" applies to the individual completing the form as opposed to name of the subscriber and form 62 is activated while initiating the process of establishing a bountied fact 200. Form 60 includes an explanation of the legalities involved and includes a signature aspect indicating claimant's understanding and acceptance of the rules as set forth by the administrator 110 and as well as any applicable governmental regulations. Likewise, Administrator 110 and subscriber 120 mutually sign similar documents during the subscription process. This agreement and understanding may be supplemented on form 62.

FIG. 3 shows an operational and organizational summary of an embodiment of system 100. Administrator 110 is a company responsible for management of system 100. Referring to FIG. 1, the steps 2-14, plus step 24, can occur autonomously within the subscriber, utilizing software infrastructure 105. In one embodiment, the content provider selects a fact to be bountied. Selects the bounty value. Identifies the fact support information 84, in one embodiment organized with respect to guideline 67 in preparation for future adjudication. And then transmits this information to the administrator as initiation data. In response, the system establishes a unique serial number 54 and transmits to subscriber 120 as authorization 207. After authorization, bountied fact 200 is identified by visual identification feature 201 identifying it as a bountied facts 200. Meanwhile, readers of the content may access auxiliary information described in FIGS. 2A and 2B to determine if they wish to file a claim. And, a later point (after a claim(s) had been filed and or adjudicated) this auxiliary data would then include relevant information as stored in bounty database module 942. Readers interested in filing a claim actually "File Claim" button 55 to initiate a form 2C to input their bounty support information 82, and (in some embodiments) to pay an application fee. Such embodiments include a transactional component to facilitate payment, is known in the art. Once a claim is initiated, bountied facts 200 are adjudicated by administrator 110 through adjudication process 112. Adjudicators are randomly chosen, either from within the administrator or (in an alternate embodiment) from interested consumers. In one embodiment adjudication is a human analysis of guideline 67 (e.g. FIG. 4). In one embodiment the adjudication process is automated by use of artificial intelligence and in that embodiment adjudication is within the realm of software 105.

After adjudicating a bountied fact 200, software 105 enables the administrator 110 to transmit adjudication data 213 and thereby implement the results of the adjudication 112 by updating one or all of: the auxiliary information presented by the subscriber website on tag 50, the associated visual identification feature 201 and the text of bountied fact 200.

Each time a reader views the article the counter is incremented per FIG. 1 to determine when the bountied fact 200 reaches as certification threshold (step 24) allowing it to elevate to certified fact 220 status and controls the associated upgrade of visual identification feature(s) 201. One such method is to count each IP address accessing the content. Keeping track of user activity is well known in the art. When the counter reaches a threshold established by the administrator, a flag is sent to the administrator indicating the fact should be certified. This information is transmitted to subscriber 120 as certification data 209. Subsequent to certification, readers who actuate certified fact icon 222 open pop-up 50 providing the auxiliary information for the now-certified fact, including all the related information previously sent to administrator, plus any certified database module 944 added since the original posting. Any reader may now submit a form 62 to try claiming the bounty on certified fact 220. As the administrator is now bears financial responsibility for paying the bounty, the adjudication (still using guideline 67) will be performed by a third-party, such as a professional mediator.

Once established as a certified fact 220, the fact (along with its auxiliary information) is entered into the certified data database 944, where it is made searchable and available for download and use within the content of any subscriber 120 through certified data port 211. In one embodiment any subscriber may use the certified fact 220 originated by any subscriber 120, in their own content, now bountied by the administrator 110. In one embodiment, each subscriber 120 pays a usage fee to download a certified fact 220. In one embodiment a portion of that usage fee is transmitted to the subscriber 120 responsible for originally contributing the fact to certified database 944. The figure shows N subscribers with equal capabilities and access, but only shows data transfer between the system administrator and "Subscriber 1" for clarity.

FIG. 4 shows an embodiment of an adjudication process 112. In step 60, a media user (a customer of a subscriber 120), hereafter referred to as "claimant 80" initiates a claim on bountied fact 200 or a certified fact 220, together known as a "bountied statement 230." In one embodiment, the subscriber has provided information substantiating the asserted bountied statement 230 (e.g. fact support information) with respect to guideline 67 during the process of establishing the initial bounty. And, when making the claim, claimant 80 provides his or her competing source information (e.g. bounty support information) to substantiate a claim that the bountied statement 230 is "false and/or misleading because . . . " With the rest of the statement provided in terms of guideline 67.

In one embodiment, the claimant 80 also submits a small adjudication fee. The purpose of the fee is to discourage spurious claims, and should be sized accordingly such as 7% of the size of the bounty, not less than $25. The task of the adjudicator therefore is limited to analysis of the information presented by the two parties and to determine if strength of the information provided by one of the parties is significantly better than the strength of the information provided by the other party, and only with respect to the guidelines 67.

In step 62, an adjudicator is assigned. If bountied statement 230 is a bountied fact 200, the adjudicator is randomly selected among appropriate staff at administrator 110, although in an alternate embodiment the adjudicator is randomly chosen from individuals who expressed interest and have been appropriately trained. In one embodiment, if bountied statement 230 is a certified fact 220, the adjudicator is a professional mediator, retired judge, or the like who will be compensated for their work. In step 68 the adjudicator analyzes the submissions from each party with respect to the guideline 67. The adjudicator may ask questions of either party in written form. These questions and the responses will become part of the adjudication history 53.

In step 70, the adjudicator renders an opinion. If the adjudicator determines the set of fact support information 84 is unambiguously ranked more highly than the set of bounty support information 82, with respect to bountied statement 230, according to guideline 67, then the bounty is not awarded. (step 72) The content of the media remains unchanged and the history of the adjudication is recorded into the appropriate database: if certified fact 220, then certified database 944; if bountied fact 200 then bounty database 942. However, in the event the adjudicator determines the set of bounty support information 82 is unambiguously ranked more highly than the set of fact support information 84, with respect to bountied statement 230, according to guideline 67 and therefore determines to be misleading and/or false (step 76) the bounty is paid to claimant 80. Step 20 is implemented: The adjudicator works with subscriber 120 to provide new wording to bountied statement 230 that reflects the findings of the adjudication; The visual identification features 201 are updated accordingly; If bountied statement 230 was a bountied fact 220, the vetting counter is reset to zero.

Lastly, a primary intent of system 100 is to make meaningful and practical distinctions and thereby establish a strong reputation and trust. Therefore, adjudications that do not yield an unambiguous result will be resolved as "indeterminate." (Step 74) And, in the interest of maintaining a strong reputation and trust, all adjudications that fall in the gray area between indeterminate and having positive or negative conclusion, will be judged as indeterminate. The result will be a visual identification feature 201 of indeterminate fact icon 203, with the wording of the fact modified to be as accurate as possible, and with the monies returned from whence they came. In one embodiment administrator 110 rewards claimant 80 a fraction of the bounty such as 10%-25% as compensation for improving the overall health of system 100.

Figure 5:
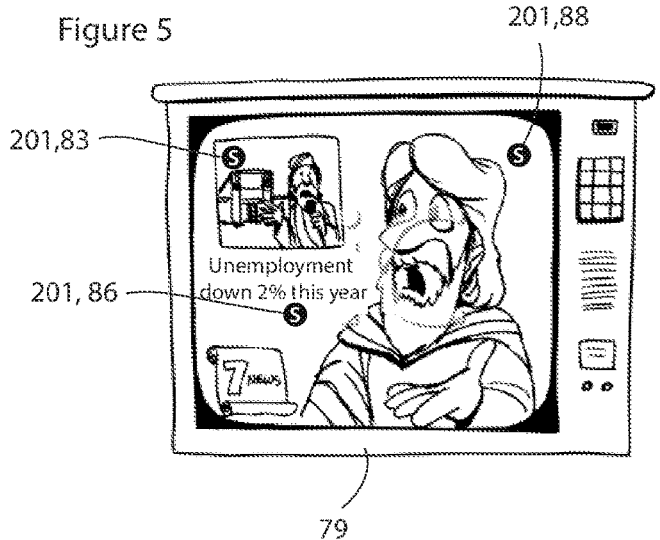
FIG. 5 shows embodiments applying the system and method to video content.

FIG. 5 shows an electronic device 79, such as a TV, smartphone, tablet, or computer presenting content such as YouTube, Facebook or the like. Content provider certification 88 pervasively indicates to the consumer that a particular content provider 120 (e.g. a YouTube channel, a Facebook page, the 4 O'clock news, the NY Times, a particular journalist, or the like) has been certified by the system and method as having a trustworthy status as established by a ranking or evaluation as a subscriber 120. For example, the same entity has proved correct in 95% or more of their text-based adjudications.

Show certification 83 indicates to the consumer of content that a particular show (such as the 4 o'clock News, Full Frontal or 60 Minutes) has been certified by System 100 as having a particular trustworthy status as established by a ranking or evaluation as a subscriber 120. For example, the same entity has proved correct in 95% or more of their text-based adjudications.

Video fact certification 86 indicates the consumer that a particular fact, statistic, statement, quotation or the like, presented momentarily in audio or visual form has been certified as accurate by a text-based embodiment of the system and method. In one embodiment the visual form includes text. The example given here is the statement "Unemployment is down 2% this year" identified by Video fact certification 86 previously supported by a certified fact 220 and identified the same icon 222 provided in text-based applications. In one embodiment, visual identification features 201 are presented dynamically in a video context, although established in a written context, as described elsewhere in the application.

Figures 6A, 6B:
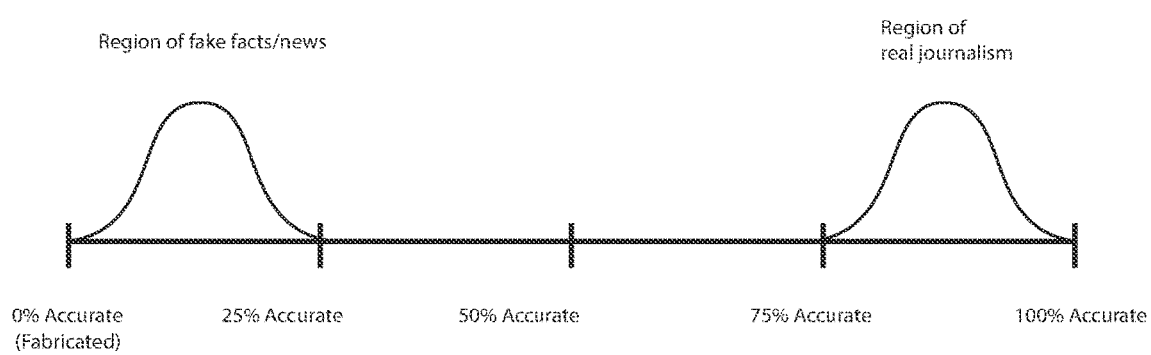
FIG. 6A shows a representational graph comparing accuracies of fake and real content, with respect to actual occurrences.
FIG. 6B shows a table of one embodiment of guideline issues for adjudication.

FIG. 6A shows a graph of the accuracy distribution of and fake and real news. The foundation of fake news is fake facts. In theory, real journalism (i.e. Journalists trying their best to be as accurate as possible) tries to operate at 100%, but, due to unavoidable bias and error legitimate journalism can be characterized as operating approximately on the right quarter of the graph, a bell curve approximately centered on a 90% level of accuracy. In contrast, fake news makes no effort to be accurate. Fake news is fabricated news based on fabricated facts. This is represented by a bell curve approximately centered at 90% level of accuracy, as an effort to be conservative. While it is certainly true that portions of fake news are real in the sense that the individuals involved are real individuals, etc. The substance of the information is fabricated, and therefore 0% accurate. To graduate this conceptual graph to one of heightened accuracy the region of fake news would probably shift to the left and the region of real journalism may also shift to the left in consideration of outliers to the profession, but the larger point remains: the gulf between fake news and legitimate news is quite large. Guideline 67 does not seek to provide means to make subtle distinctions in evaluating truth. Truth is an abstract concept. However, determining the difference between intentional falsehood and accurate reporting is a definable task, because of the large gap that commonly (if not always) exists between the two. Determining shades of gray is difficult. Determining black-and-white is not. Ultimately, the criteria for success or failure of the system and method will be its ability to maintain respect in the eyes of the public. This will occur if decisions for claimant 80 and for subscriber 120 occur outside of the region of ambiguity, here shown to be quite large. One of the objectives of the system and method is to reveal fake news and establish visual patterns to help consumers identify the originators of fake news. Fake news does not exist in subtlety or nuance of interpretation.

FIG. 6B shows one embodiment of guidelines 67. In one embodiment, the guidelines are simple and universally applicable. Not every guideline category will be applicable to every analysis. Cases in which neither or both parties have a similar result, the category can be ignored. For example, in a cases in which both sides contain significant bias, the "bias" category is not meaningful to the analysis. Support information must apply to the case in order to be considered. It is the job of the adjudicator first to determine which one(s) of the guidelines are applicable to each case, and then to make an analysis comparing the bounty support information 82 and fact support information 84, provided by the two parties (including any additional clarifying information requested from either party) in a mechanistic manner, quantifying the similarities and differences in each category and the magnitudes of the differences in each category. As shown in FIG. 6A, it is simple to discern the difference between news based in reality and news based in fabrication. And, to avoid falling into this gray area, the system and method defaults to an indeterminate conclusion 74. In one embodiment, whenever a gray area exists between the two adjudication opinions of ruling for claimant 76 or ruling for subscriber 72, the default will always be indeterminate 74. In one embodiment, the system and method follows the dictionary definition of unambiguous, "not open to more than one interpretation."

In one embodiment of mechanistic manners, states that quantifiable variations larger than X % are meaningful and therefore unambiguous. In this embodiment, X is selected to be as small as 10% to as large as a factor of two (200%).

One alternative embodiment to step 76 includes the ruling making a determination whether the fact was "misleading" or "false." Such embodiments include a two-step analysis, with numerical variation below X (an absolute value) or x % variation as "indeterminate", between X and Y absolute values as "misleading" and greater than Y (absolute value) or Y % as "false.", with both misleading and false determinations as rulings for claimant 76.

An important feature is that these mechanistically evaluated adjudications are performed consistently with the same guideline. The following is an exemplary guideline 67 broken down to analyze the specifics of quality and quantity rigorously.

Quality

1) Distance to the Source

Support information originating closer to the source is superior. For example: first-hand information supersedes secondhand information. While a measure of quality, this is not a subjective evaluation and can be performed rigorously.

2) Degree of Bias/Objectivity

Support information provided by a less-biased source is superior. Bias can take many forms. Most obvious is financial, but bias can come from historical, religious or personal reasons. The adjudicator will consider the degree of bias/objectivity between the source information. Non-disclosed material bias is considered misleading. While a measure of quality, determining the existence of bias is not a subjective evaluation and can be performed rigorously.

3) In Cases Involving Expertise, Identify the Quantity of the Expertise

The quantity of expertise in a particular field is measured in years of experience within that field. Experts in the field will be victorious over novices. Quantity of expertise can be objectively measured 4) Unaltered Unaltered data is superior to altered data. Detecting alteration can be difficult, but once found it is an objective determination.

Participants are Immaterial

This portion of the guideline applies only to the adjudicator, not to the applicants. A fundamental principle of adjudication is the participants and any characteristic of the participants is immaterial, including the professional reputation of the participant. The adjudication shall ONLY analyze the source information, with respect to quality and quantity.

In the first embodiment, the adjudicator is instructed to evaluate the support materials 82,84 with respect to the above guideline 67 to determine if one party has unambiguously superior source material, and then adjudicates accordingly. However if neither party has unambiguously superior source material, the adjudicator must make a determination of "indeterminate."

Quantity

5) Number of data points

Data points must be verifiably true. More data points is superior to fewer data points. And numerical representation should be proportional. And more generally, verification of the same information by multiple sources will be victorious over a position verified by a single source. All these factors are objectively measurable.

6) Completeness/Omissions

More complete information is superior. Misleading statements often hinge on omitted information. Complete quotations will be victorious over partial quotations. A simple test is: if the meaning of the bountied fact changes by including omitted information, the fact will be judged to be false and/or misleading. Measuring completeness is objectively measurable.

7) Excessive Complexity

Ideally, each adjudication could be performed with a single variable at issue. Often two or three factors or elements play a role, which must be balanced in order to make a final determination. Fortunately for the system and method, as shown in FIG. 6A, the large gap between real and fake news means that multiple factors all point in the same direction and no balancing need be considered. However, one component of this exemplary guideline is that adjudications requiring balancing of a large number of factors or elements in which factors/elements conflict will result in an indeterminate finding 74.

8) Mathematical Analysis

Some determinations require analysis based in logic or mathematics. This is rigorous by definition.

Adjudication Example #1

Bountied Fact: "The moon is made of green cheese."

When establishing the bounty, the subscriber 120 provides substantiating information, with the understanding it will be evaluated under guideline 67. In this example, subscriber 120 provides the results of a survey of 30 children at Longwood Elementary school, stating 20 believe the moon is made of green cheese and text of the writer John Heywood.

A reader named John Smith is suspicious of the veracity of the fact, and activates information tag 50. After performing the research, Smith believes he has superior information. He files a claim through claim initiation interface 55 and formulates his arguments as follows: the relevant issues are 3 and 6.

3) In cases involving expertise, identify the quality of the expertise "Determining the composition of the moon falls in the realm of expertise. The children at Longwood Elementary school have less expertise in this area than Tom Watters, a geologist specializing in the moon for 28 years.

6) Completeness/Omissions

Material information has been omitted: the origin of the fact. The test is that by including additional information (the source of the data) the meaning of the fact changes. It is not a statement of fact. It is the result of a survey.

And furthermore, the two compound because the survey is from people who have less expertise than people who disagree with the fact.

If the adjudicator has any questions, he can pose them in written form to either party. The adjudicator's questions and the responses from the subscriber and the claimant will be entered into the claim's adjudication history 53. The adjudicator will determine that the claimant has unambiguously superior support according to the guideline 67 and will award the bounty to Smith. The adjudicator will then work with the subscriber to rewrite the fact. Also, the counter in step 20 will be set to zero, meaning the fact is starting from the beginning on its path to becoming a certified fact 220.

Adjudication Example #2

Bountied Fact: "American school children believe the moon is made of green cheese." When establishing the bounty, subscriber 120 provides the same information as example #1.

A reader named Jane Doe is suspicious of the veracity of the fact. She finds a survey of 500 American school children stating 3% believe the moon is made of green cheese." Jane Doe filed a claim and formulates her argument on 5 (number of data points) is the relevant issue.

5 (number of data points)

"My source of 500 data points is significantly large than the subscriber's source of 30 data points."

The adjudicator will conclude that 500 data points is unambiguously larger than 30 data points and will award the bounty to Doe.

Adjudication Example #3

Bountied Fact: "American school children believe the moon is made of green cheese." When establishing the bounty, subscriber 120 provides the same information as example #1.

John Smith is suspicious. He investigates and learns that the survey was sponsored by a cheese company. Smith files a claim on 2) bias.

2) Bias

"The fact has undisclosed bias and is therefore misleading."

The adjudicator will conclude that omitting the bias of the origin of the survey is a material bias and furthermore that the proportionality was misleading . . . and awarding the bounty to Smith.

Adjudication Example #4

Bountied fact: A survey of 30 children at Longwood Elementary school has concluded the moon is made of green cheese." When establishing the bounty, subscriber 120 provides the same information as example #1.

Jane Doe disapproves because she knows that the moon is not made of green cheese. She formulates her arguments based on 3) expertise Expertise 3)

Doe states, "Determining the composition of the moon falls in the realm of expertise. The children at Longwood Elementary school have less expertise in this area than Tom Watters, a geologist specializing in the moon. (Note: The same assertions made by the claimant in example #1.)

In this case the judgment will be in the favor of the subscriber 120, because even though the conclusion is false, the statement is accurate. By including additional information, the subscriber has created an overall statement that is neither false nor misleading.

Adjudication Example #5

Bountied fact: "Abraham Lincoln was the best US president in history."

It goes without saying the subscriber placing a bounty for this fact, will have a large amount of supporting information. Likewise, a claimant will provide a large amount of evidence suggesting the fact is not correct. In the interest of brevity, the well-known arguments of both sides are omitted. The adjudicator may conclude that one of the two is more correct than the other . . . .

However, there will not be a clear victor and the system and method is not designed or intended to make subtle distinctions. Therefore, this is an important example.

In this case it is safe to assume all the aspects with respect to quality will not yield clear differentiation. For example, there will be approximately comparable degrees of expertise arguing for Lincoln and for other presidents. Therefore, the only approach under the guideline would be a mechanical analysis of the number of instances each president achieved greatness, including a secondary analysis attempting to sign a "greatness magnitude" to each individual greatness achieved, and perform a similar analysis on the failings of each president. In this manner it would theoretically be possible to apply the guideline. However, such an analysis triggers the 7) excessive complexity part of the exemplary guideline.

The result of a guideline analysis will not have a clear and convincing result in one direction and therefore the judgment would be indeterminate 74. The bounty would be returned to the subscriber 120. Any payment made to initiate the claim would be returned to the claimant. Most importantly, the purported "fact" 200, would be hereafter identified by a visual identification feature as indeterminate. And, in one embodiment, establishing a bounty that is to ultimately found be indeterminate reflect poorly on subscriber ranking.

In one embodiment, with a rigorous application of objectively observable guideline categories, the adjudicator can determine whether or not one set of support data is unambiguously stronger/superior to the other. And, in those cases in which a determination cannot be made unambiguously, the default is a ruling of indeterminate 74.

One avenue to defeat system 100, in the short term, is simply to lie. However, in one embodiment system 100 also includes a universal bounty paid by administrator 110 to anyone who can identify deceit by subscribers 120 or by claimants 80. Whenever deceit is revealed, the matter is corrected both in terms of the posted information and also the financial awards. A variety of options are contemplated for addressing deceit by a claimant 80 or subscriber 120, including (i) iconography identifying the related fact is deceptive (ii) iconography identifying all the contributions of deceitful party and (iii) banishment from system 100.

Figure 7:
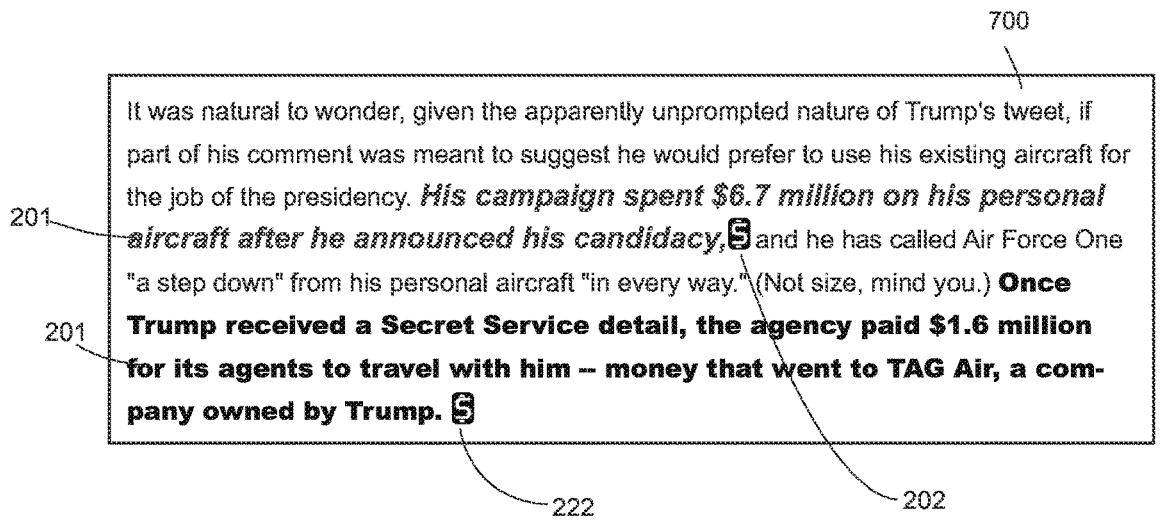
FIG. 7 shows an embodiment of the system and method applied to a magazine.

FIG. 7 shows an example of the system and method embodied in a printed magazine 700, such as the print edition of Time magazine. An evaluation guideline 67 is printed in the magazine, such as FIG. 6B. This guideline 67 is established to compare the relative strength of two different sets of support information as adjudicated in the non-electronic portions of FIG. 4. A printed identification feature 201 identifies a bountied fact 200 with a light shade of green, a color identified within magazine 700 as the color used to identify a bountied fact 200. In this embodiment bountied fact 200 is identified by bountied fact icon 202, also a light shade of green.

When the magazine 700 decides to publish an article incorporating bountied fact 200, it posts a notification letter to the administrator organization who oversees implementation of the system and method. This letter includes the text of bounty fact 200, its related initiation data 205 and a check to cover the amount of the bounty. In practical terms, magazine 700 will have multiple bountied facts 200 active at once and will maintain a certain balance in escrow with the administrator organization to cover a few of the largest bounties. In one embodiment the administrator organization sends a response email approving the bounty and providing a serial number 54 for future identification.

The magazine is then published and by virtue of identification feature 201, the reader is informed a bounty exists, offered by the paper to a reader who can counter the validity of the fact as written by providing stronger support information than currently utilized by magazine 700, as determined by guideline 67. The administrator organization maintains a list of bountied facts 200, written on a sheet of paper. This list includes, for each bountied fact 200: the date of publication, the amount of the bounty, the serial number 54, the "vetting count" and also a vetting threshold associated with each magazine 700. In this embodiment, the vetting count (functionally equivalent to the MAX of step 24) is the number of days transpired with a bountied fact 200 released with a particular wording. In this embodiment, the vetting threshold is selected as a function of the size of readership of that particular magazine. Large magazines have more readers per day and therefore their vetting threshold will be lower because the purpose of the vetting threshold is to establish a point in time at which a particular fact is sufficiently vetted by the public as to be considered a certified fact 220. The number selected as the vetting threshold is subjective and will be chosen by the administrator organization, but a typical range is from 10,000-200,000 readers. In this example, the vetting threshold (at 8,000 readers per day) will be set at 25 days.

At any time, a reader interested in collecting the bounty can learn more by sending a letter of inquiry to the administrator organization 110. (In an alternate embodiment the reader can learn more by sending the letter of inquiry to the offices of the magazine 120 directly.) In one embodiment, the letter of inquiry identifies bountied fact 200 by quoting it in its entirety. In an alternate embodiment, the letter of inquiry refers to serial number 54 which can be printed in the magazine after the last word of bountied fact 200.

In response, the administrator organization (or magazine) responds to the reader by mailing the information provided on information tag 50, including the fact support information 84 originally provided by the magazine, the value of the bounty 56, the overview claim history 52, including the number of claims that have been filed against this particular bountied fact 200 previously and the detailed adjudication history 53 of those claims, including any communications between other readers and the magazine 53. Subsequent to receiving this information the reader may decide to become a claimant 80 by submitting a claim application form 60, including the reader's set of bounty support information 82. Claimant 80 will then submit form 60 by mail to the administrator organization, which then makes a determination whether the bounty support information 82 provided by claimant 80 or the fact support information 84 provided by magazine 700 has a higher relative strength as measured by guideline 67. In one embodiment, the administrator performs an adjudication following FIG. 4. The adjudication may require additional postal communication with magazine 700 and/or claimant 80. All communication will be recorded for inclusion in the brief claim history 52 and a detailed adjudication history 53. Claims are adjudicated in the order received. Adjudicators are randomly chosen from a pool of candidates within administrator 110. In one embodiment, any person can apply to be an adjudicator.

In one embodiment, if the claimant's fact support information is unambiguously stronger/superior, in the analysis of the adjudicator: (i) the claimant 80 will be mailed a check for amount of the bounty as an award, the monies taken from the escrow held on behalf of the magazine 700; (ii) bountied fact 200 will be reworded and still identified a light green color with a new bounty (eligible for eventual certification) and the bountied fact icon icon will be changed to black, indicating the text is no longer original. (iii) the claim and adjudication histories 52,53 will be updated, including an analysis by the adjudicator and all adjudication-related communications; and (iv) because the magazine lost the adjudication 76.

In one embodiment, adjudications proceed as described in FIG. 4. If the adjudicator determines the set of bounty support information 82 is unambiguously ranked more highly than the set of bounty support information 84, with respect to bountied statement 230, according to guideline 67, then (i) the claimant 80 will be mailed a check for amount of the bounty as an award, the monies taken from the escrow held on behalf of the magazine 700; (ii) bountied fact 200 will be reworded and still identified a light green color with a new bounty (eligible for eventual certification) and the bountied fact icon will be changed to black, indicating the text is no longer original. (iii) the claim and adjudication histories 52,53 will be updated, including an analysis by the adjudicator and all adjudication-related communications; and (iv) because the magazine lost the adjudication 76.

In this scenario, the vetting counter is reset to zero days (step 20). The fact will be changed, along with the visual identification feature 201 and magazine 700 will be republished.

If the magazine's fact support information 84 is unambiguously stronger in the judgment of the adjudicator: (i) the claimant 80 will not receive the bounty; (ii) the claim and adjudication histories will be updated, including an analysis by the adjudicator and all adjudication-related communications; (iii) the vetting counter is unaffected; and (iv) the visual identification features 201 are unaffected.

If neither of the above conditions are true (meaning the relative strength between the two sets of support information are ambiguous) the adjudication shall be ruled indeterminate, with the following results, in one embodiment: (i) the bounty is returned to magazine 700; (ii) any application fee is returned to claimant 80; (iii) the fact can no longer be bountied and will be printed as orange in the future.

The outcome of the adjudication will be mailed to claimant 80 and magazine 700. And, magazine 700 will reprint the magazine with the bountied fact 200 and the visual identification features 201 modified accordingly.

Furthermore, the administrator organization monitors the written list of bountied facts 200, noting if and when one of the bountied facts 200 on the list reaches the vetting counter threshold, in this example 25 days, without the text being changed as described above in this example. On the 25$^{th}$ day, the administrator organization mails a notification to magazine 700 stating: (i) bountied fact 200 is now certified fact 220 and to reprint the magazine with the visual identification feature 201 altered to present in a dark green color; (ii) that the size of the bounty has been increased, typically between twice and 10 times the size; (iii) that the financial responsibility for paying the bounty has transitioned from magazine 700 to the administrator organization; (iv) that future adjudications would be performed by an independent third-party; and (v) that the newly certified fact 220 was being entered into a written certified fact portfolio (a vetted fact database) which is made available to all magazines working with the administrator organization for use in their own publications as a certified fact 220.

In one embodiment, magazine 700 would receive a one-time economic benefit for having contributed a fact to the portfolio, such as a subscriber free reduction or other kind of payment. In one embodiment, magazine 700 would receive on-going economic benefit as a function of the number of times the fact it contributed to the portfolio was selected for use by other publishing entities, as described in FIG. 11.

Figure 8:
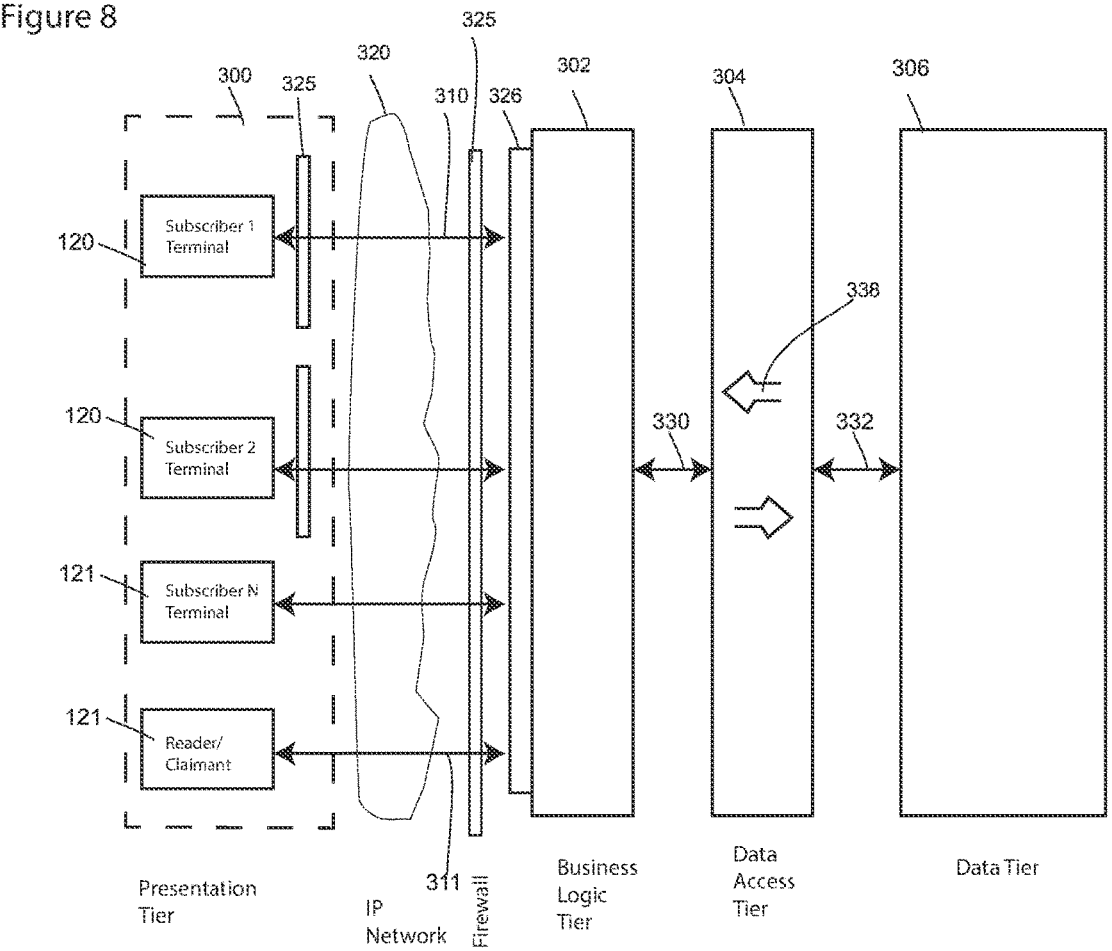
FIG. 8 shows an embodiment of the system and method in a computer network.

FIG. 8 shows an exemplary system architecture of the system and method, applicable to both: (i) the application-based embodiment of FIGS. 10A, 10B, and (ii) the web-based embodiment of FIG. 12.

According to one embodiment, the system may be comprised at least in part of off-the-shelf software components and industry standard multi-tier (a.k.a. "n-tier", where "n" refers to the number of tiers) architecture designed for enterprise level usage. One having ordinary skill in the art will appreciate that a multitier architecture includes a user interface, functional process logic ("business rules"), data access and data storage which are developed and maintained as independent modules, most often on separate computers.

According to an embodiment of the system and method, the system architecture comprises a presentation logic tier 300, a business logic tier 302, a testing tier, a data access tier 304, and a data tier 306. The presentation logic tier 300 (sometimes referred to as the "client") comprises the layer that provides a user interface for subscribers 120 into the application (e.g., session, text input, dialog, and display management, fact and bounty selection, etc) which will typically be accessible from the administrator's system and from article consumption devices (usually web browsers) for the end-user, the latter as an end product of a plugin system. The plugin here is integrated in the business logic tier 302 alongside the main services and is installed in the subscriber's article publishing system as a content modification plugin Another embodiment of the plugin is a web browser plugin coupled with a shallow content management plugin which is placed in the article publisher's system process for a simple generator of user interface. The presentation logic tier 300 works with the results output of the business logic tier 302 to handle the transformation of the outputs 310, 311 into something usable and readable by the subscriber's machine 120 often behind a firewall 325. Optionally, a user may access the system by using a client machine that is not behind a firewall 325, as may be the case in some user environments. Similarly, a reader or claimant may access functionality and information (as described elsewhere in the application) to the administrator system from behind a firewall 325, or not. The system uses Web-based user interfaces, which accept input and provide output 310, 311 by generating web pages that are transported via the Internet through an Internet Protocol Network 320 and viewed by the user using a web browser program on the client machine 120, 121, but can as well use standalone executable interfaces (application windows and dialogs), for the presentation of the main content and interaction with it or for preprocessing tasks for the content management systems that do not work via Web-based interfaces. In one embodiment of the system and method, device-specific consumer-level presentations are presented to mobile devices such as smartphones, PDA, and Internet-enabled phones.

According to an embodiment of the system and method, the business logic tier 302 may also include a proxy 326 acting on behalf of the end-user's requests 310, 311 to provide access to the core business logic tier 302 using a standard distributed-computing messaging protocol (e.g., SOAP, CORBA, RMI, DCOM, etc) for purposes of load-balancing. The proxy 326 allows for several connections to the business logic tier 302 by distributing the load through several computers. The proxy 326 receives requests 310, 311 from the Internet 320, machines 120, 121 and redirects the response generated by the services provided by the Business Logic Tier 302 back to the end-users.

The business logic tier 302 contains one or more software components 840 for business rules, data control, etc., and provides a route of communication to the end user and the plugins embedded in various content management systems via the HTTPS internet secure protocol as well as REST/SOAP/AJAX/ETC protocols and techniques. In addition, the Business logic tier 302 controls transactions and asynchronous queuing to ensure reliable completion of transactions, and thereby improves scalability and flexibility as system components are added or moved. The Business logic tier 302 works in conjunction with the Data Access Tier 304 to manage distributed database integrity. The Business Logic Tier 302 also works in conjunction 864, 865 with the Testing Tier to assess and examine system integrity. The Data-Access Tier 304 is a collection of reusable interfaces that contains generic methods 338 to manage the movement 332 of Data 344 to and from the Data Tier 304, The Data-Access Tier 304 contains no data or business rules, other than some data manipulation/transformation logic to convert raw data into structured data that the Business layer 302 may use in order to provide the required services to the subscribers' user interface.

The Data Tier 306 is the layer that contains the Database System 344 and is only intended to deal with the storage and retrieval of information. The Data Access Tier 304 provides database management functionality and is dedicated to data services that may be optimized without using any proprietary database management system languages. The database can be implemented in one or more instances, communicating with each other via standard distributed database protocols and techniques such as DDP. The data management component ensures that the data is consistent throughout the distributed environment through the use of features such as data locking, consistency, and replication. As with the other tiers, this level is separated for added security and reliability.

Figure 9:
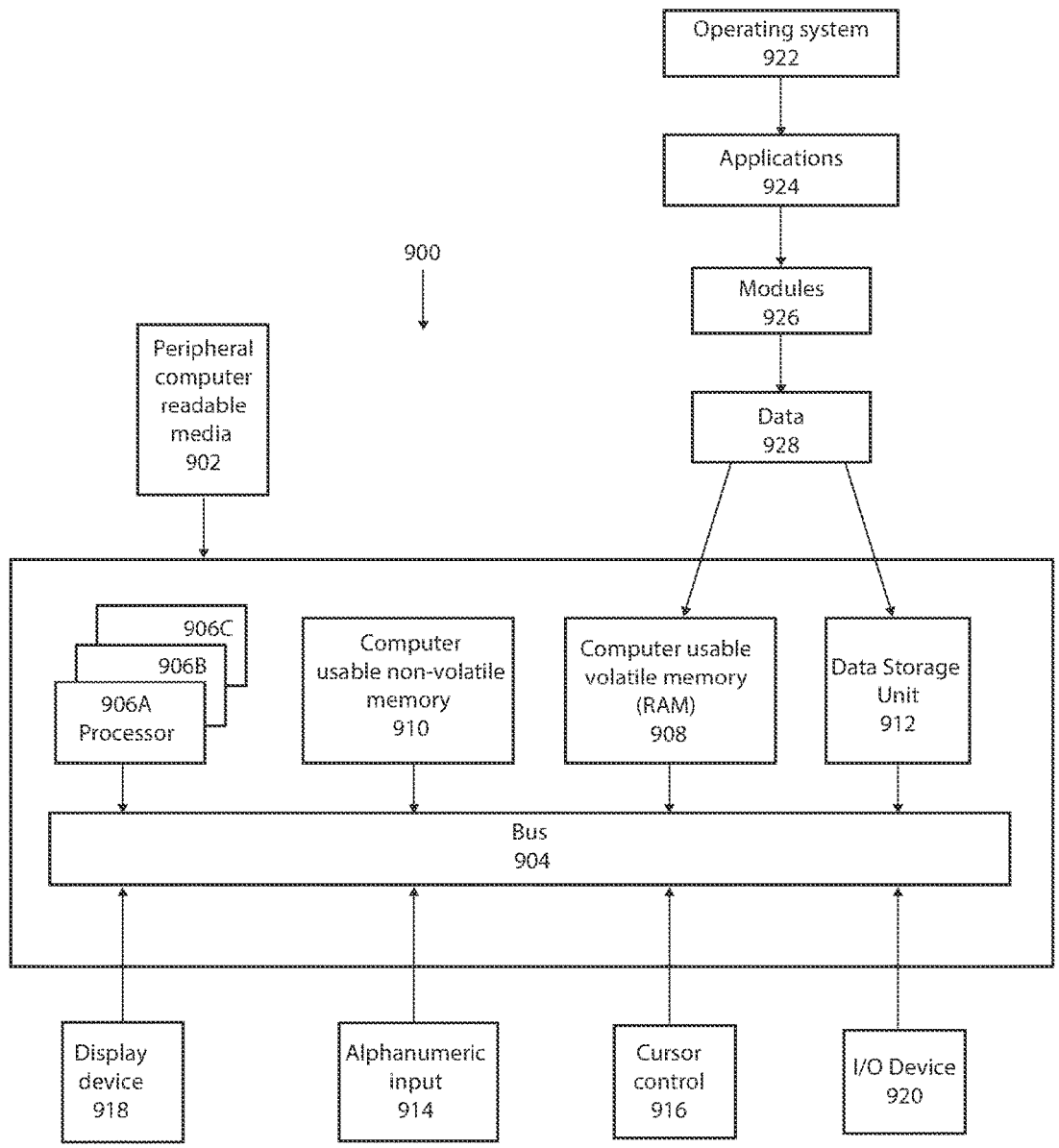
FIG. 9 shows an example computing system.

FIG. 9 shows one example of a type of computer that can be used to implement one embodiment of the system and method utilizing computer-readable and computer-executable instructions that reside, for example, in or on computer-usable media of a computer system. Although computer system 900 of FIG. 9 is an example of one electronic embodiment, the system and method is well suited for operation with a number of different computer systems including general purpose networked computer systems, embedded computer systems, routers, switches, server devices, user devices, various intermediate devices/artifacts, standalone computer systems, mobile phones, personal data assistants, and the like. In one embodiment, computer system 900 of FIG. 9 includes peripheral computer readable media 902 such as, for example, thumb drives, optical disks, DVDs, and the like coupled thereto. Computer system 900 also includes an address/data bus 904 for communicating information, and a processor 906A coupled to bus 904 for processing information and instructions. In one embodiment, computer system 900 includes a multi-processor environment in which a plurality of processors 906A, 906B, and 906C are present. Conversely, computer system 900 is also well suited to having a single processor such as, for example, processor 906A. Processors 906A, 906B, and 906C may be any of various types of microprocessors. Computer system 900 also includes data storage features such as a computer usable volatile memory 908, e.g. random access memory (RAM), coupled to bus 904 for storing information and instructions for processors 906A, 906B, and 906C. (01.07 Computer system 900 also includes computer usable non-volatile memory 910, e.g. read only memory (ROM), coupled to bus 904 for storing static information and instructions for processors 906A, 906B, and 906C. Also present in computer system 900 is a data storage unit 912 (e.g., a magnetic or optical disk and disk drive) coupled to bus 904 for storing information and instructions. Computer system 900 also includes an optional alpha-numeric input device 914 including alpha-numeric and function keys coupled to bus 904 for communicating information and command selections to processor 906A or processors 906A,906B, and 906C. Computer system 900 also includes an optional cursor control device 916 coupled to bus 904 for communicating user input information and command selections to processor 906A or processors 906A, 906B, and 906.C. In one embodiment, an optional display device 918 is coupled to bus 904 for displaying information.

Referring still to FIG. 9, optional display device 918 may be a liquid crystal device, VR headset, plasma display device or other display device suitable for creating graphic images and alphanumeric characters recognizable to a user. Optional cursor control device 916 allows the computer user to dynamically signal the movement of a visible symbol (cursor) on a display screen of display device 918. Implementations of cursor control device 916 include a trackball, mouse, touchpad, joystick or special keys on alphanumeric input device 914 capable of signaling movement of a given direction or manner of displacement. Alternatively, in one embodiment, the cursor can be directed and/or activated via input from alphanumeric input device 914 using special keys and key sequence commands or other means such as, for example, voice commands. Computer system 900 also includes an I/O device 920 for coupling computer system 900 with external entities. In one embodiment, I/O device 920 is a modem for enabling wired or wireless communications between computer system 900 and an external network such as, but not limited to, the Internet. Referring still to FIG. 9, various other components are depicted for computer system 900. Specifically, when present, an operating system 922, applications 924, modules 926, and data 928 are shown as typically residing in one or some combination of computer usable volatile memory 908, e.g. random access memory (RAM), and data storage unit 912. However, in an alternate embodiment, operating system 922 may be stored in another location such as on a network or on a flash drive. Further, operating system 922 may be accessed from a remote location via, for example, a coupling to the Internet. In one embodiment, the system and method is stored as an application 924 or module 926 in memory locations within RAM 908 and memory areas within data storage unit 912.

Figure 10A:
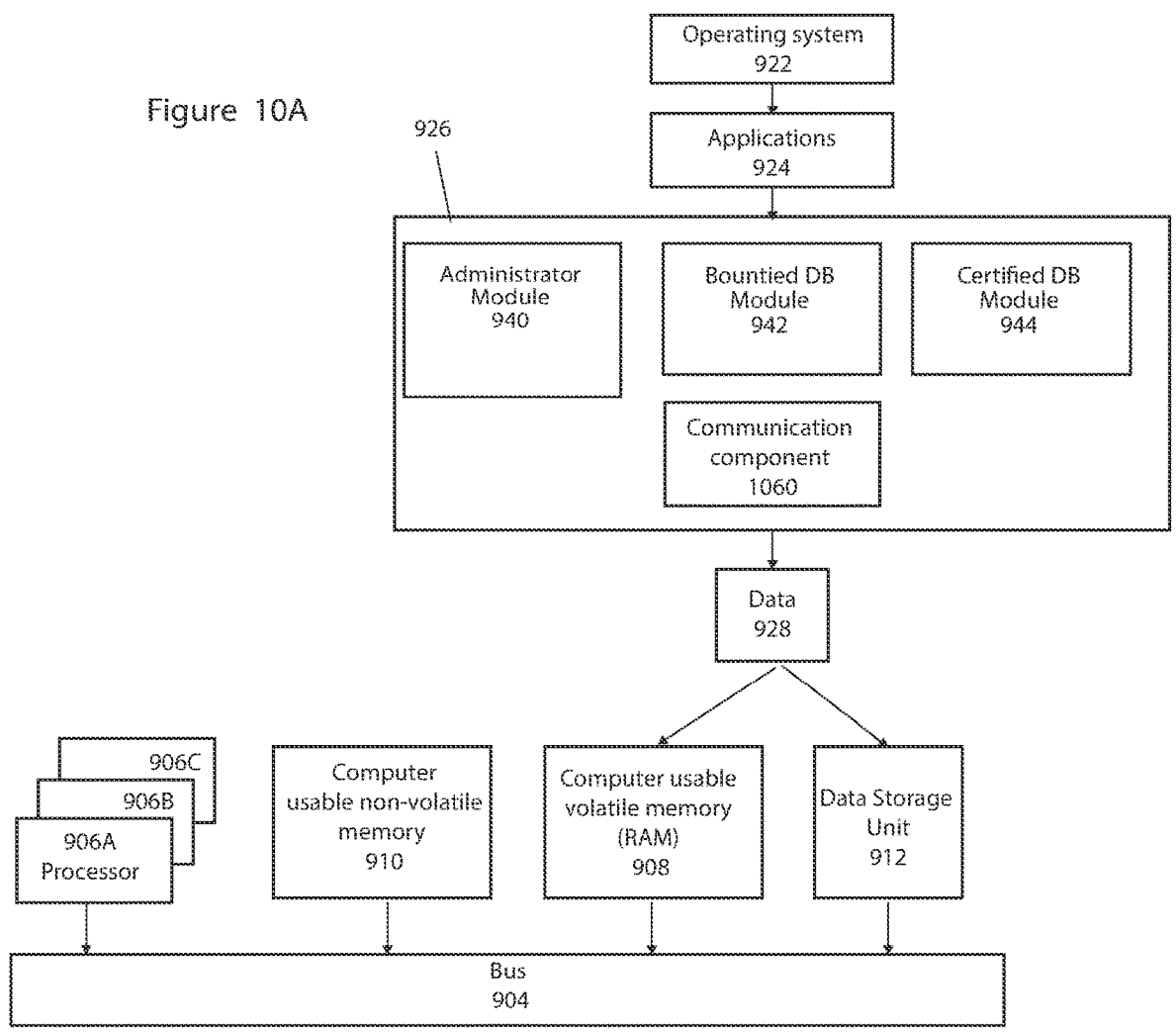
FIG. 10A shows the administrator portion of an application-based embodiment of the system and method

FIG. 10A shows the administrator portion of an application-based embodiment of system 100. A computing system (such as FIG. 9) hosts an application containing modules 926 including: administrator module 940, and bountied database module 942, certified database module 944, and communication component 1060, implemented to communicate with communication component 1060 of FIG. 10B.

Administrator Module 940

Self-contained application implementation embodiment requires the Content Management System plugin to be much more powerful than in other cases, being responsible for more functionality. The end-user typically reads the subscriber's publication with a web browser from an internet enabled device. In order for the article to be powered by the system, the plugin must transform a markup code into a visual color highlighting of the chosen text and functionality such as icon 222 with a Click-enabled popup 50, therefore by adding HTML/CSS/Javascript to the web document served by the subscriber's publishing system to the end-user. Then it must secure the communication to the admin application for counting each unique page view. In cases where this is not possible, such extra functionality will be delegated to the admin module of the app, running at administrator premises and the Content Management System plugin will simply add extra security checks to prevent the subscriber to tamper with the view count.

The app works with Subscribers and Admins. Content providers can apply to become subscribers. They are issued unique subscriber IDs upon registration. This is done via a simple authentication window and interface from the admin module 940 that creates and manages the user. The module facilitates the receipt of subscriber fees in connection with the chosen payment gateway. The administrator user level will show a personal window, for each administrator, with received submissions of proposed facts to be bountied. This will be hidden by an authentication window. The admin will also be enabled to respond by issuing a unique serial number, and an authorization to bounty the fact. Further processing is done by the logic inside module 926 of FIG. 10B in connection with communication component 1060 to enable the subscriber's plugin to publish the fact with the custom end-user oriented popup and icons 202,222.

When a bounty is filed including information and funds from reader Administrator responds with confirmation of receipt AND adds information to the bounty database module 942 simply by actuating the functionality of their custom window (for example, the receipt would be automatically sent upon when the Admin approves adding this to the bounty database) by clicking an "Approve" button.

Bountied Adjudication

After the adjudication is complete (Reader wins) funds are sent to reader and new wording is sent to subscriber and information is added to bounty database module 942 and this updated information is now associated with the fact located on subscriber website. Icon color is changed to reflect loss and any subsequent article viewer will be able to tell this visually.

After the adjudication is complete (reader loses) information of loss is sent to reader and information is added to bounty database module 942 and this updated information is now associated with the fact located on subscriber website.

After the adjudication is complete (indeterminate result) information is sent to reader and new wording is sent to subscriber and information is added to bounty database module 942 and this updated information is now associated with fact located on subscriber website. Icon color is changed to reflect loss.

When subscriber software transmits the flag indicating that a fact is ready for certification, the fact moves from the bountied database module 942 to the certified database module 944.

Certified Adjudication when a CERTIFIED bounty is filed including information and funds from reader Administrator responds with confirmation of receipt AND adds information to the certified database module 944.

After the adjudication is complete (Reader wins) funds are sent to reader and new wording is sent to ALL SUBSCRIBERS using the certified fact and information is added to certified database module 944 and this updated information is now associated with fact located on ALL SUBSCRIBERS website. Icon color is changed to reflect loss.

after the adjudication is complete (reader loses) information of loss is sent to reader and information is added to bounty certified module 944 and this updated information is now associated with fact located on ALL SUBSCRIBERS' websites.

after the adjudication is complete (indeterminate result) information is sent to reader and new wording is sent to ALL SUBSCRIBERS and information is added to certified database module 944 and this updated information is now associated with fact located on ALL SUBSCRIBERS websites. Icon color is changed to reflect loss.

Bountied Database Module 942

Either a separate database or a module/table inside the same distributed database as certified database module 944, is simply a raw data storage system that the business logic acts upon. The difference between the 942 and 944 is not technical. The distinction is semantic and exists for clarity.

Business logic inside module 926 upon receipt of a fact, assigns a new bounty, provides results to a facts search page which is searchable by all subscribers. Any subscriber 120 can download a certified fact 220 and have it appear in their content with an associated visual identification 201.

Figure 10B:
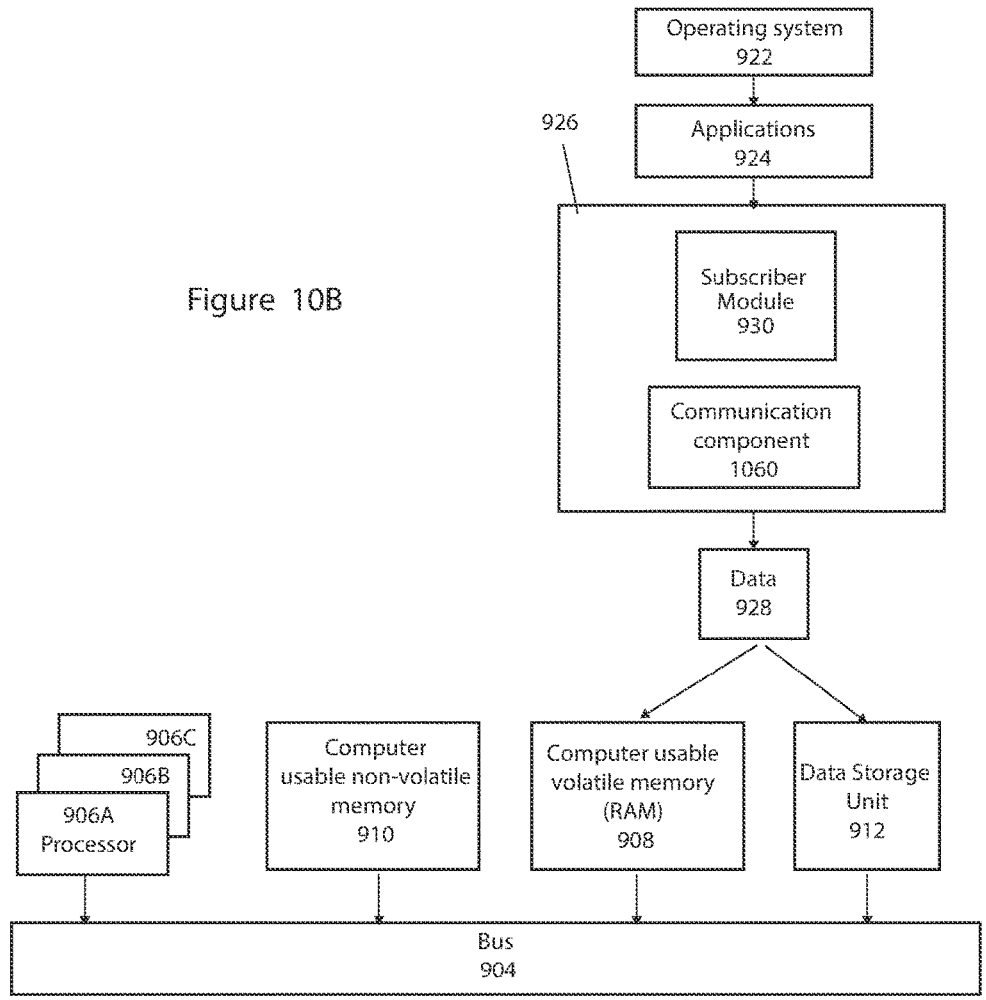
FIG. 10B shows the subscriber portion of an application-based embodiment of the system and method.

FIG. 10B (Subscriber) shows the subscriber 120 portion of an application-based embodiment of system 100. A computing system (such as FIG. 9) hosts an application containing modules 926 including: subscriber module 930 and communication component 1060, implemented to communicate with communication component 1060 of FIG. 10A.

Subscriber Module 930 for Subscriber client

Each content provider has a unique subscriber ID, issued at account registration by the system. The content provider selects a fact to be bountied by interacting with the software from inside their custom window shown after login. As described before, the subscriber can select the bounty, identify the support information and transmit this information to the administrator, all from within their custom window (customized by user type and id). The administrator responds with a serial number and authorization to actuate a bountied fact 200. After authorization, the fact is highlighted in a particular color with a particular icon added at the end of the fact, a feature automatically provided by the Content Management System plugin installed at the Subscriber. Readers who click on the icon open a window popup providing all the information previously sent to administrator, plus any bounty database module 942 on since the original posting. Readers who click on "File Claim" button open a form to input their own version of support information, and pay an application fee, all information being recorded in the system database.

In one embodiment, the module can monitor the number of readers accessing the content with the bountied fact 200. This is the case where extra security needs to be implemented into the plugin, so that the subscriber cannot tamper with the article view count.

When the number reaches a threshold established by the administrator, a flag is sent to the administrator indicating the fact should be certified. Subscriber has the ability to search certified database module 944 and facts originating from the certified database module 944 can appear in their content identified by a specific color and a specific icon.

Readers who click on the icon open a new window or tab providing all the information previously sent to administrator, plus any certified database module 944 added since the original posting.

Readers who click on "File Claim" button open a form to input their own version of support information, and are able to pay an application fee.

The subscribers and the administrators view of the application allows transmission of funds, using the main financial mechanism (bank to bank transfer or plugin modules like Stripe, Braintree, 2Checkout). If there is no funds in a subscriber a escrow account, Subscribers transfer the funds to the escrow account when establishing the bounty.

Figure 11:
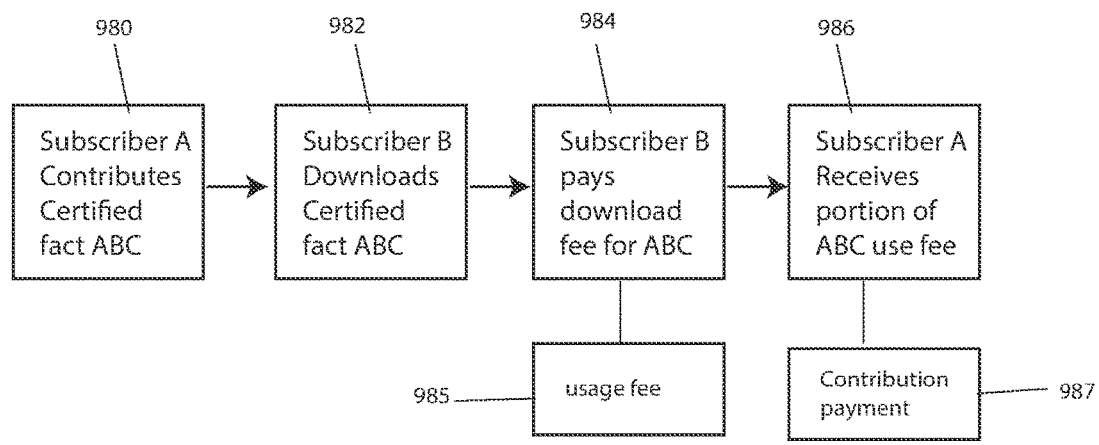
FIG. 11 shows an embodiment of financial payments around the usage of certified facts.

FIG. 11 shows an embodiment in which subscriber 120 pays a one-time usage fee 985 to utilize a certified fact 220 contributed by a different subscriber 120. Also embodied in FIG. 11 is an example in which the contributing subscriber receives a portion of the usage fee 985. In step 980 subscriber "A" contribute a specific certified fact, "ABC." In step 982, a different subscriber "B" after having reviewed facts in the certified fact database, determines that one of their stories would benefit from utilization of fact ABC. In step 984, subscriber B pays the ABC usage fee 985. In step 986, subscriber A receives a contribution payment 987, which here represents a portion of usage fee 985. This mechanism provides one of the receiving benefits of system 100, that being a small cottage industry in the production of fascinating and yet verifiably accurate statements.

Other payment structures are contemplated with respect to usage fees 985 and contribution payments 987, including for the size of the fee/payment to be proportional with subscriber readership volume.

Figure 12:
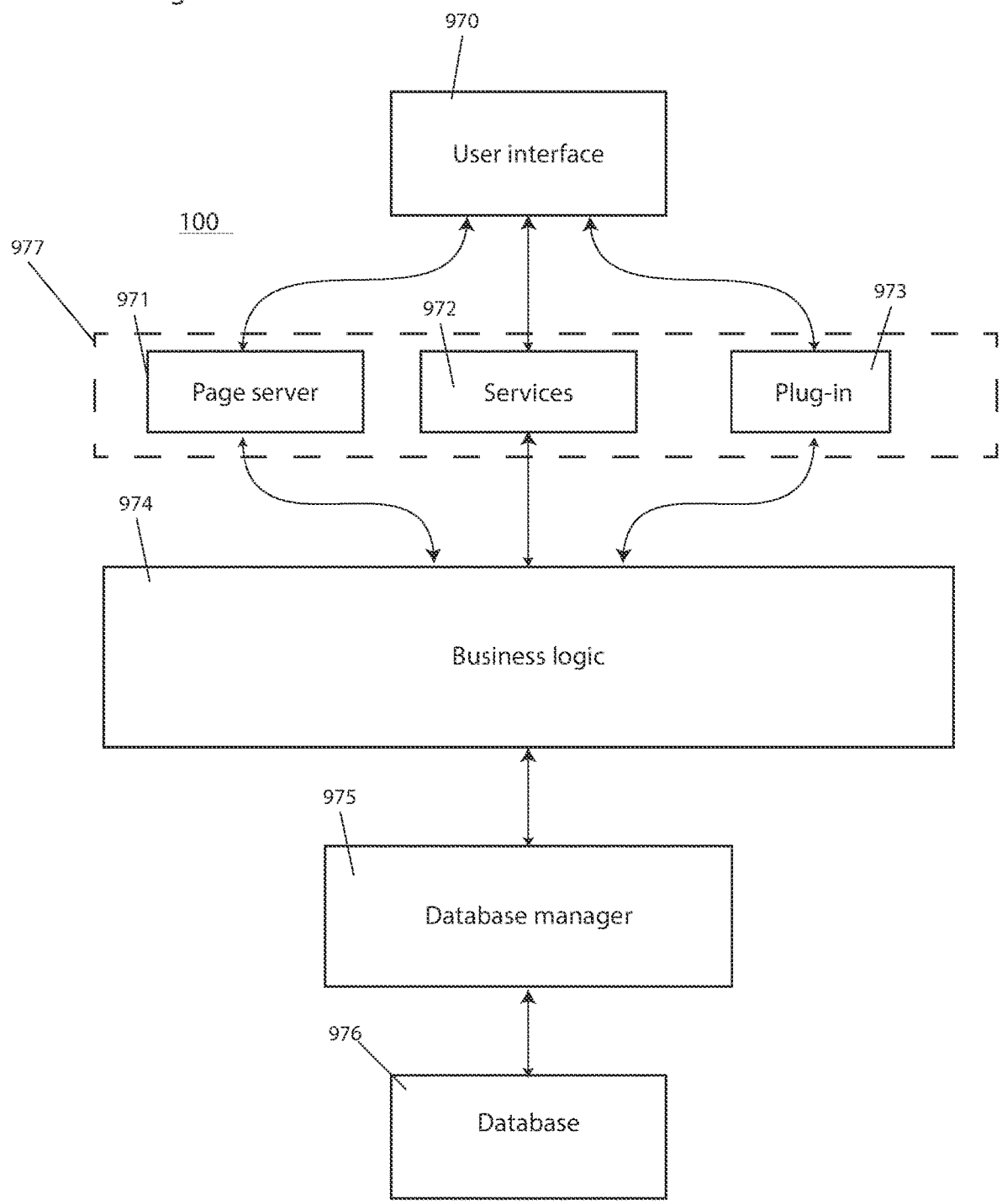
FIG. 12 shows a web-based embodiment of the system and method.

FIG. 12 shows an embodiment of system 100 embodied as a modern style web responsive and service based application with a remote plugin system for the various Content Management Systems used by the article writers. First, the system has 5 types of users: administrator 110, Subscriber 120, Reader/claimant 80, Adjudicator, and the Public, each with different levels of access and permission to the website and the system 100.

Administrator 110: Typically an employee, this user controls the first part of the bounty process, where Subscribers select facts to be bountied and then communicate with him/her for the duration of the bounty process, all through the web system. Any such communication is appended at the fact's page viewable from the unique #ABCD id for that particular fact.

Subscriber 120: Typically an article writer, this user will initiate the bounty process by selecting the facts from his/her own articles to be bountied. The website will require a 30% of the bounty value to be deposited by the Subscriber in the website's financial account and, to that end, puts at his/her disposal a number of standard, renowned web payment modules and gateways tied with the bounty process (Bank direct transfer, Stripe, Braintree, 2Checkout, Paypal, Bitcoin system, etc.).

Claimant 80: Typically any article reader who chooses to interact with the bounty process via the "File" button 55 associated with icons 202,222 to submit a claim form 60,62. In some embodiments, claimant 80 is also required to pay a percentage of the bounty, in order to begin the adjudication process.

Adjudicator: In one embodiment, adjudicators for bountied claims 200 are employees of administrator 110, randomly selected for each adjudication. In alternate embodiments, the public may be used, again randomly selected for each adjudication from a pool of interested participants. In one embodiment adjudication of certified claims 220 is performed by professional mediators. The adjudicator of the super bounty is the court system.

Public/reader: Typically any unregistered user browsing the site, has full access to any fact history, including all Subscriber-Admin-Reader communication, via accessing an URL of type "http://www.serum.com/facts/ABCD", but cannot interact with the site in any other way.

System 100 is implemented with several standard layers customized to fit the purpose: user interface module 970, Interface handling module 977 (with submodules webpage server 971, services module 972, plug-in 973, business logic 974, Database manager 975, and Database 976:

User interface 970 is a collection of HTML/CSS/Javascript code that visually shows the website to the end user, and an interactive popup 50 inside text articles written by various article writer/media creators, popup which is triggered by the end-user clicking another UI element placed in the article's text by the plugin, e.g. icons 202 or 222.

The code makes calls into the Services layer 972 on predefined standard REST routes or with a similar method.

Interface handling layer 977 contains: Web page server 971. This module responds to standard HTTP/HTTPS requests from a web browser residing on any number of devices (pc, mac, mobile) by returning a set of HTML/CSS pages that are enabled to access the website services via normal HTTP POST/GET methods and via AJAX, involving Javascript queries. Services module 972 represents a collection of standardized REST (or SOAP or another alternative) calls, which the web browser and the plugin use to standardize higher level semantic requests to the system. For example, the user creation process requires several steps in the business logic layer (generating a unique id number, creating new database entry, ensuring protection against SQL injection, selecting appropriate levels of permissions for that particular user type and writing it in the newly created user's database table row, etc.), but in the Service layer we would simply have a standardized call route such as "POST/user/create" that both the web browsers and the plugin can access as it is made on top of standard HTTPS communication. Plugin 973 converts a selected part of a written article, at the Subscriber's publishing system, into the web browser code that triggers the popup 50 which is marked in the article via the icons 202,222 and the color highlight. For this to happen, the plugin must be installed in the article publisher's system and the article writer needs to be logged into our system. The plugin then takes a text markup carrying a unique id number like "[PLUGIN_SERUM #ABCD]" and a terminal markup like "[/PLUGIN_SERUM]" given to the subscriber by the system in a negotiation with a user type called Administrator 110 which happens within a section of the website and, upon the article publisher making the article public, transforms this code into the necessary HTML/CSS/Javascript code that would visually mark the selected words of text with the special icons 202, 222 and with the color highlighting, also enabling the clicking functionality that further ties the functionality with the main system.

Business logic 974 contains all the business logic that responds to the requests coming from the service module, the web browser, and the plugin module by organizing the data accessed from methods belonging to the Database manager layer 975. This layer can be written in PHP or Java/Scala for the Play Framework web application SDK. Database manager 975 insures validity of data across all database instances and converts business logic requests into the appropriate SQL language understood by the chosen database engine. This is accomplished by carefully creating Transactions and rolling back batches of queries when one of the queries fails, in order to restore the original database state, as well as by employing several methods of data security and replication across the databases. The database layer 976 consists of a standard relational or NoSQL database, ideally distributed across more than one physical machine, with any of the MySQL, MS SQL, Oracle, Mongo DB, Couch DB being a reasonable choice. This layer includes the necessary methods to store into and retrieve data from one or more database and/or database table.

Comments on Exemplary Administrator Website

In one embodiment of the system and method, the administrator website may be developed using CSS, HTML, Javascript, and PHP. The data layers can be provided using a relational database such as MySQL, SQL Server, Oracle, or by a NoSQL database such as CouchDB or MongoDB. The choice of database should reflect the importance of data being secure from alteration by third parties, providing resistance for both to brute force and to subtle alterations. Accurate replication and validation of entered data across data nodes would take priority over speed and accessibility. The server core application could be developed using Java/Scala Play Framework, generating, managing or being consistent with the chosen database schema. The exemplary website could be developed with an open source repository manager such as GitHub, a configuration management system; a test management environment consisting of use cases employed for unit, functional and user interface testing, a means of automating or recording test results, a summary report of test results, and a report of which parts of the system have not been tested.

In one embodiment of the system and method, the administrator website will recognize 2 main type of users, adapting the visual output and restricting features according to user type: a) administrator's own employees and b) subscribers/others. The system 100 provides each content provider subscriber 120 also with software hooks (or plugins) that integrate into their content management system of choice (e.g. Wordpress) for the conversion of a markup text written into the article before the publishing step (or via xml or another method appropriate to the particular content management system) into end-user interactable code, marked in the subscriber's article visually by the visual identification feature 201 and/or bountied fact icon 202. The code would be actuated by the user clicking the chosen symbol 202 and would be capable of redirecting the user to the administrator website for a detail view of that particular facts history, as well as providing the features described in FIG. 2B, namely showing data about Bounty, Support Data html links, serial number 54, and, importantly, a way to interact with the administrator website, triggered by clicking on the FILE button 55. This plugin would be working together with a special section of the administrator website to enable the functionaries working at subscriber 120 to select specific facts within the context of their work and identify each as a bountied fact 200, so that when the content is presented to readers on the subscriber website, the bountied fact 200 is identified by a visual identification feature 201 including a bountied fact icon 202 in such a way that readers may actuate information tag 50 to both provide information about the bountied fact 200 and also to provide readers an entry point to file a claim to receive the bounty and thereby become a claimant. Filing a claim requires the reader to submit an explanation including independently verifiable data that contradicts or supersedes the fact support information 84 presented by subscriber 120. The hooks work in conjunction with the administrator website services provided by the main server application for authentication, communication, and data storage. Namely, any hooks or plugins will send to and receive data from the administrator website application necessary for accomplishing the task at hand. They can enter markup or otherwise modify the articles being written and the publishing system working in conjunction with the deeper part of the plugin will turn the markup in the appropriate user interactive features, such as a HTML/CSS/Javascript popup that give the user access to the data after the visual identification feature 201 (and more specifically icon 202,222) is clicked upon. The popup (e.g. tag 50) will further tie the user interaction with the administrator website system, giving the user access to authentication, account creation, and claim entry services, even if simply by redirection to the main website with a html anchor.

In one embodiment of the system and method, methods are provided to cover: 1) establishing facts as bountied, both within the context of the subscriber website as well as certification to the administrator as well as authorization from the administrator to the subscriber including the provision of a serial number 54 as well as all functionality related to information tag 50; 2) the financial transactions associated with filing a claim, placing money into escrow, and paying a full bounty; 3) the user login/registration and credential use associated with being a subscriber 120; 4) the ability to support interactions between administrator and subscriber with respect to adjudications (both bountied and certified facts) such that all communications are captured and ultimately entered into the claim history; 5) the ability to support interactions between the administrator and the claimant with respect to adjudications such that all communications are captured and ultimately enter into the claim history; 6) facilitating the handoff from the subscriber 120 to the administrator 110 of the process of filing and processing a claim, including the related financial transactions; 7) monitoring the access and usage of bountied facts (without negative adjudication) as means to determine when each specific fact may be considered sufficiently vetted to qualify for status as a certified fact 8) managing the authorization and transition from a bountied facts to a certified fact subsequent to successfully completing the vetting process; 9) providing the subscriber the ability to scan the certified database for facts of interest as well as the ability to download and incorporate those facts into new content and 10) supporting the transmission of adjudication-related information between the claimant and a fourth-party adjudicator, as well as the capture of this information for addition to the claim history and 11) supporting the transmission of adjudication-related information between the subscriber and a fourth-party adjudicator, as well as the capture of this information for addition to the claim history.

In one embodiment of the system and method, the presentation layers of the administrator website include a Homepage, subscriber fee page providing pricing information and support financial transactions with subscribers; a Search box, an About Us page, a certified data search page allowing subscribers to login and explore the certified data database; and a public page allowing anyone to perform research on both bountied and certified facts, including their claim histories, bounties paid, bounties not paid, and further including all adjudication communications. All information on the public page is persistent and uneditable.

Comments on Exemplary Interaction Between Subscriber and Administrator Websites

Content management systems have a wide variety of pre-existing architectures. However the system and method exploits existing functionalities that are pervasive: (i) the ability to select the color of particular words and/or their highlighting; (ii) the ability to insert iconography into text (such as emoticons) and (iii) the ability to provide links to specific content, other webpages, and to transact financial services. The steps necessary to accomplish this are:

1) Installation of a Content Management System Plug-in by the IT manager
2) Editing of an article using the CMS's default methods, placing a marker that the plugin can use to uniquely identify the fact within the body of the article and the system
3) Publishing the article for the end-user which involves triggering of the plugin. This step will convert the unique identifier markup placed in the article by the subscriber into both the visual identification features 201, especially including icons 202, 222 and associated functionality, popup information tag 50. For the cases where the end-user is expected to have blocked the necessary browser functionalities such as Javascript, a simple HTML anchor pointing to the administrator website will be placed around the icon, advancing the user upon clicking to a view on the administrator website that has all the same information and capabilities as the inline icon and popup achievable with HTML/CSS/Javascript.
4) In order to prevent subscribers from modifying the count of your access and thereby accelerating the vetting process, in one embodiment, the web browser plugin is coupled to a shallow CMS plugin. This offers superior tracking of end-user interaction and limit the subscribers' ability to tamper with assessing the user view count on its natural path to the maximum of step 24.

Subscriber interaction: All subscribers have to first register into the main administrator website. This step provides them with a subscriber ID number that identifies each subscriber as unique throughout the system. When a subscriber proceeds to write an article and wants to use the system, he/she firstly logs into the administrator website and, either via a special part of the Content Management System plugin or via direct interaction with the Administrator website inside a web browser, selects a piece of text from his/her article as a fact to be bountied and copies it to the webpage/plugin window. Then proceeds to add support information in the same page/window and selects a monetary bounty to be paid for the disproval of the claim. He/She then presses the Submit button and the fact/claim request is presented to an Administrator user by the system.

Administrator will use his/her website custom functionality to approve a particular claim and authorize the actuation of a bountied fact. The Subscriber would then be sent, tied to the administrator's own unique id, a unique code for placement in the article, code which both uniquely identifies the fact in the system and serves as a trigger for the plugin system in the article publishing phase.

If the article is published before the authorization takes place, there would be no visual identification features 201, (including no icons 202,222) and no highlighting but the background code will still be inserted and active. After authorization, the text selected to be bountied will have been transformed by the plugin and/or the system into the final text form, with icons 202, 222, highlighting and user interaction popup functionality.

Readers who click on icon open a popup or a new browser tab pointing to the administrator website and providing them with all the information previously sent to administrator, plus any bounty database module 942 on since the original posting. Readers who click on "File Claim" button open a form to input their own version of support information, and pay an application fee all information recorded in the database. The end-user code responsible for module 50 (popup) monitors the number of readers by a combination of user analytics tools, tracking the user IP and cookies only when accessing the content with the bountied fact. Because the view count is a very important metric in the system, protection is added via a choice of several tools ranging from special fingerprinting techniques brought by anti-bot for ad networks tools such as Fraudhunt, to machine learning, and to custom-made algorithms that tap into the Subscriber's website metrics and analytics in an effort to distinguish genuine traffic and article consumption patterns from bots. When the number reaches a threshold established by the administrator, a flag is sent by the system to the responsible administrator indicating the fact should be certified.

Anyone has the ability to search certified database module 944.

The facts originating from the certified database module 944 can appear in the subscriber's content identified by a specific color and a specific icon.

The information in the popup window and on the website has a full history of all information relating to it, from all the information previously sent to the administrator plus any certified database module 944 added since the original posting.

Readers who click on "File Claim" button open a form where they can input their own version of support information, and pay an application fee via the financial facilities setup by the website which can be a bank to bank account transfer system or a plug-in system approved for transparency with a choice from the commonly used web payment systems such as Stripe, Braintree, 2Checkout, etc.

There is also support for funds to transfer between subscriber and administrator, again linked to a transparent payment process, all transferred funds being clearly and publicly assessable from the website, from each fact history page.

Embodiments of the present disclosure further relate to any one or more of the following paragraphs:

1. A method to increase readership or viewership of a content provider by increasing trustworthiness of data-oriented content provided by the content provider, including: providing architecture to support selection of a fact of interest disposed within content of the content provider; providing architecture to collect a set of fact support information from the content provider in support of the assertion that the fact of interest is accurate with respect to a specific pre-established written universal fact evaluation guideline; and providing architecture to identify the fact of interest with a first visual identification characteristic indicating a first bounty shall be paid to a third-party as a first award for providing a set of bounty support information determined to supersede the accuracy of the set of fact support information with respect to the effective interest as measured by the specific pre-established written universal fact evaluation guideline.

2. A method including: selecting a fact of interest disposed within content of the content provider; identifying a set of fact support information from the content provider in support of the assertion that the fact of interest is accurate with respect to a specific pre-established written universal fact evaluation guideline; and identifying the fact of interest with a first visual identification feature indicating a first bounty shall be paid to a third-party as a first award for providing a set of bounty support information determined to supersede the accuracy of the set of fact support information with respect to the effective interest as measured by the fact evaluation guideline.

3. A method to combat the rise of fake news, including: providing a tool to identify a fact disposed within content of the content provider; providing a form to collect a set of fact support information from the content provider in support of the assertion that the fact of interest is accurate with respect to a fact evaluation guideline; and providing a tool to identify the fact of interest with a first visual identification characteristic indicating a first bounty shall be paid to a claimant as a first award for providing a set of bounty support information determined to supersede the accuracy of the set of fact support information with respect to the fact as measured by the fact evaluation guideline.

4. A system including: an evaluation guideline established to compare the relative strength of a first set of fact support information and a second set of fact support information; a first visual identification characteristic established to identify a fact wherein the fact is associated with a first set of fact support information and disposed within informative content and furthermore has an associated bounty offered as reward to a claimant who can provide a second set of fact support information determined by the evaluation guideline to have a higher relative strength than the first set of fact support information.

5. A system including: a generic fact evaluation guideline established to compare a relative strength of a first set of fact support information and a second set of fact support information, wherein both sets pertain to a fact, in order to determine one of two outcomes: the fact, as written, is more accurately characterized by the first set of fact support information, or the fact is more accurately characterized by the second set of fact support information a text-based media including a bounty identification feature implemented to provide access to a first set of fact support information supporting a fact offering a bounty as reward to a claimant submitting a second set of fact support information wherein the second set of fact support information characterizes the fact better than the first set of fact support information.

6. The system or the method according to any one of the paragraphs 1-5 wherein the generic fact evaluation guideline includes a third outcome wherein the differences between the first set of fact support information, and the second set of fact support information are ambiguous and therefore the relative strength is indeterminate.

7. The system or the method according to any one of the paragraphs 1-6 further including a plurality of vetting counters, each counter disposed to increment the count upwards from an initial value in response to a consumer access event to the fact disposed within informative content and also to decrement the count to the initial value as a function of the evaluation guideline determining the claimant provided a second set of fact support information determined by the evaluation guideline to have a higher relative strength than the first set of fact support information; a vetting counter threshold, as measured from the initial value; and a vetted fact database populated by written facts associated with one of the plurality of vetting counters that reached the vetting counter threshold.

8. The system or the method according to any one of the paragraphs 1-6 further including a plurality of vetting counters, each counter disposed to increment the count upwards from an initial value in response to a consumer access event to the fact disposed within informative content and also to decrement the count to the initial value as a function of the evaluation guideline determining the claimant provided a second set of fact support information determined by the evaluation guideline to be unambiguously more accurate than the first set of fact support information; a vetting counter threshold, as measured from the initial value; and a vetted fact database populated by written facts associated with one of the plurality of vetting counters that reached the vetting counter threshold.

9. The system or the method according to any one of the paragraphs 1-8 further including an interface associated with the first visual indication characteristic, the interface activating an information tag including at least one of an amount of the first bounty, the set of fact support information, an author, a serial number, an adjudication history, or any combination thereof.

10. The system or the method according to any one of the paragraphs 1-9 wherein the interface further provides a claim initiation interface enabling the third party to initiate filing a claim in an effort to receive the submission of the set of bounty support information.

11. The system or the method according to any one of the paragraphs 1-10 further including an interface associated with the first visual indication feature, the interface activating an information tag including at least one of an amount of the first bounty, the set of fact support information, an author, a serial number, an adjudication history, or any combination thereof.

12. The system or the method according to any one of the paragraphs 1-11 wherein the interface further provides a claim initiation interface enabling the third party to initiate filing a claim in an effort to receive the submission of the set of bounty support information.

13. The system or the method according to any one of the paragraphs 1-12 wherein the first set of fact support information and second set of fact support information transferred to administrator to evaluate the first set and the second set in reference to the evaluation guideline.

14. The system or the method according to any one of the paragraphs 1-13 wherein the first set of fact support information is associated with a content provider and wherein the content provider selects the size of the first bounty.

15. The system or the method according to any one of the paragraphs 1-14 wherein the content provider provides the financial resources to pay the first bounty.

16. The system or the method according to any one of the paragraphs 1-15 wherein the evaluation guideline includes three outcomes wherein one of those outcomes is indeterminate.

17. The system or the method according to any one of the paragraphs 1-16 wherein an indeterminate outcome results in the fact being identified by a second visual identification characteristic associated with an indeterminate adjudication outcome.

18. The system or the method according to any one of the paragraphs 1-17 wherein the evaluation guideline is directed to a mechanical analysis of the quality and quantity of data in the two sets.

19. The system or the method according to any one of the paragraphs 1-18 further including quantifying reader exposure to the fact and upon reaching a predetermined certification threshold quantity of reader exposure replacing the first visual identification characteristic with a third visual identification characteristic now associated with a first set of fact support information whereby the fact is thereafter identified as a certified fact by virtue of reaching the predetermined certification threshold quantity and wherein the certified fact is disposed into a database consisting of a plurality of certified facts contributed by a plurality of content providers.

20. The system or the method according to any one of the paragraphs 1-19 wherein the certified fact is assigned a second bounty wherein the second bounty is greater than the first bounty.

21. The system or the method according to any one of the paragraphs 1-20 wherein ones of the plurality of content providers can search the database and subsequently utilize certified facts originated by others of the plurality.

22. The system or the method according to any one of the paragraphs 1-21 wherein the fact is embedded in video content and the first visual identification characteristic is displayed at a moment in time corresponding with presentation of the certified fact.

23. The system or the method according to any one of the paragraphs 1-22 wherein an administrator provides financial resources to pay the second bounty and wherein certified facts are adjudicated by a fourth party.

24. The system or the method according to any one of the paragraphs 1-23 wherein one of the plurality contributing a specific certified fact to the database receives payment as a consequence of another of the plurality electing to utilize the specific certified fact.

25. The system or the method according to any one of the paragraphs 1-24 further including awarding usage rights of a certification badge after individually achieving a notification quality threshold with respect to a number of favorable adjudications.

26. The system or the method according to any one of the paragraphs 1-25 wherein the fact is embedded in video content and the first visual identification characteristic displays at a moment in time corresponding with presentation of the fact.

27. The system or the method according to any one of the paragraphs 1-26 further including a super bounty in support of a proposition that the system is unbiased, the super bounty to be adjudicated by the fourth party.

28. The system or the method according to any one of the paragraphs 1-27 further including transmitting the first set of fact support information to an administrator.

29. The system or the method according to any one of the paragraphs 1-28 wherein each of the plurality are of content providers is a subscribers.

30. The system or the method according to any one of the paragraphs 1-29 wherein a determination to award the bounty includes an adjudication of the relative quality and quantity of the first and second sets of fact support information.

31. The system or the method according to any one of the paragraphs 1-30 further including a first fact contribution to the database from the first content provider and a second content provider retrieval of the first fact contribution including an associated payment from the second content provider retrieval to the administrator.

32. The system or the method according to any one of the paragraphs 1-31 further including a second payment from the administrator to the first content provider.

33. The system or the method according to any one of the paragraphs 1-32 wherein bountied or certified facts are strung together in sequence.

The details of one or more embodiments of the system and method are set forth in the accompanying drawings and the description below. Other embodiments include, but are not limited to applying the system as described to the context of video and audio presentations.

It is to be understood that the embodiments and exemplary descriptions of this application are merely illustrative of the system and method and that one skilled in the art may devise variations without departing from the scope of the system and method. It is therefore intended that all such variations be included within the scope of the following claims and their equivalents.

What is claimed:

1. A computer system for adjudicating a proposed fact and a claimant fact, comprising: one or more modems configured to communicate with external networks via wired or wireless communication; and computer-usable memory at least transiently storing a certified fact database and instructions that, when executed by one or more processors, cause the system to:
   a) access said proposed fact, a proposed fact support, and a bounty submitted by a user;
   b) access said claimant fact and claimant fact support submitted by a second user;
   c) adjudicate the proposed fact support and the claimant fact support by comparing: 1) distance of a proposed fact source and a claimant fact source from an original source, 2) degree of bias present in the proposed fact source and the claimant fact source, 3) expertise of the proposed fact source and the claimant fact source, 4) level of data alteration present in the proposed fact and the claimant fact, 5) number of data points in the proposed fact and the claimant fact, 6) level of completeness in the proposed fact and the claimant fact;
   d) generate an adjudication score for the proposed fact support and the claimant fact support based on the adjudicating;
   e) in response to the generating the adjudication score for the proposed fact support is higher than the adjudication score for the claimant fact support, identifying the proposed fact as a certified fact; and
   f) enter the certified fact into the certified fact database and distribute the bounty to the user after the proposed fact and proposed fact support has been submitted for a month by the user without losing an adjudication.

2. The computer system of claim 1, wherein the computer system further comprises a display device; and wherein the entering of the certified fact into the certified fact database causes the system to present the certified fact with a visual identification feature, wherein the visual identification feature presents the certified fact as dark green text and a dark green icon.

3. The computer system of claim 1, wherein the modem is a wireless modem.

4. The computer system of claim 1, wherein the proposed fact, the proposed fact support, and the bounty is from a media outlet.

5. The computer system of claim 1, wherein the proposed fact, the proposed fact support, and the bounty is from a journalist.

6. The computer system of claim 1, wherein the comparing is automated by artificial intelligence.

7. The computer system of claim 1, wherein the comparing of the expertise of the proposed fact source and the claimant fact source comprises comparing a number of years of experience of the proposed fact source and the claimant fact source within a field of study.

8. The computer system of claim 1, wherein the comparing of the level of completeness of the proposed fact and the claimant fact is determined by measuring an amount of omitted information in the proposed fact and the claimant fact.

9. A computer system for adjudicating a proposed fact and a claimant fact, comprising: one or more modems configured to communicate with external networks via wired or wireless communication; and computer-usable memory at least transiently storing a database system and instructions that, when executed by one or more processors, cause the system to:

a) access said proposed fact from the proposed fact database, a proposed fact support, and a proposed fact bounty submitted by a user;
b) access said claimant fact and a claimant fact support submitted by a second user;
c) adjudicate the claimant fact and the claimant fact support by comparing: 1) distance of a claimant fact source and a proposed fact source from an original source, 2) degree of bias present in the proposed fact source and the claimant fact source, 3) expertise of the proposed fact source and the claimant fact source, 4) level of data alteration present in the claimant fact and the proposed fact, 5) number of data points in the claimant fact and the proposed fact, 6) level of completeness in the claimant fact and the proposed fact;
d) generate an adjudication score for the claimant fact support and the proposed fact based on the adjudicating;
e) in response to generating the adjudication score for the claimant fact support is higher than an adjudication score for the proposed fact, identifying the proposed fact as false;
f) correct the proposed fact from the proposed fact database and identify the proposed fact as corrected; and
g) distribute the proposed fact bounty to the claimant.

10. The computer system of claim 9, wherein the computer system further comprises a display device; and wherein the identifying of the proposed fact as false causes the system to identify the false fact by a visual identification feature, wherein the visual identification feature presents the corrected fact as an icon.

11. The computer system of claim 9, wherein the comparing is automated by artificial intelligence.

12. The computer system of claim 9, wherein the proposed fact is from a media outlet.

13. The computer system of claim 9, wherein the proposed fact is from a journalist.

\* \* \* \* \*